US012395718B2

(12) United States Patent
Lee et al.

(10) Patent No.: US 12,395,718 B2
(45) Date of Patent: Aug. 19, 2025

(54) CAMERA ACTUATOR AND CAMERA DEVICE COMPRISING SAME

(71) Applicant: LG INNOTEK CO., LTD., Seoul (KR)

(72) Inventors: Sung Guk Lee, Seoul (KR); Jae Keun Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 370 days.

(21) Appl. No.: 18/020,482

(22) PCT Filed: Aug. 10, 2021

(86) PCT No.: PCT/KR2021/010591
§ 371 (c)(1),
(2) Date: Feb. 9, 2023

(87) PCT Pub. No.: WO2022/035192
PCT Pub. Date: Feb. 17, 2022

(65) Prior Publication Data
US 2023/0269453 A1   Aug. 24, 2023

(30) Foreign Application Priority Data

Aug. 11, 2020   (KR) .................. 10-2020-0100603
Oct. 19, 2020   (KR) .................. 10-2020-0135235

(51) Int. Cl.
*H04N 23/55*   (2023.01)
(52) U.S. Cl.
CPC .................... *H04N 23/55* (2023.01)

(58) Field of Classification Search
CPC ........ H04N 23/55; G02B 7/04; G02B 13/009;
G03B 2205/0023; G03B 2205/0069;
G03B 17/17; G03B 30/00; G03B 5/00
See application file for complete search history.

(56) References Cited

U.S. PATENT DOCUMENTS

| 2017/0155847 | A1* | 6/2017 | Ito ......................... F16M 13/022 |
| 2021/0199983 | A1* | 7/2021 | Kazuo ................ G02B 13/0065 |
| 2022/0021794 | A1* | 1/2022 | Jun ......................... H04N 23/52 |

FOREIGN PATENT DOCUMENTS

| JP | 2013-178397 | 9/2013 |
| KR | 10-2008-0110494 | 12/2008 |

(Continued)

OTHER PUBLICATIONS

International Search Report dated Nov. 25, 2021 issued in Application No. PCT/KR2021/010591.

(Continued)

*Primary Examiner* — Mekonnen D Dagnew
(74) *Attorney, Agent, or Firm* — KED & ASSOCIATES

(57) ABSTRACT

An embodiment of the present invention discloses a camera actuator comprising: a housing; a first lens assembly and a second lens assembly moving in the optical axis direction in the housing; and a driving unit for moving the first lens assembly and the second lens assembly, wherein the first lens assembly includes a first outer side surface, and the second lens assembly includes a second outer side surface which faces the first outer side surface and at least partially overlaps the first outer side surface in the optical axis direction and a bonding member that is in contact with at least one of the first outer side surface and the second outer side surface.

20 Claims, 28 Drawing Sheets

(56) References Cited

FOREIGN PATENT DOCUMENTS

| | | |
|---|---|---|
| KR | 10-2018-0053623 | 5/2018 |
| KR | 10-2019-0128279 | 11/2019 |
| KR | 10-2020-0020147 | 2/2020 |
| WO | WO 2019/199129 | 10/2019 |

OTHER PUBLICATIONS

European Search Report dated Jul. 22, 2024 issued in Application No. 21856198.3.

* cited by examiner

[FIG. 1]
1000
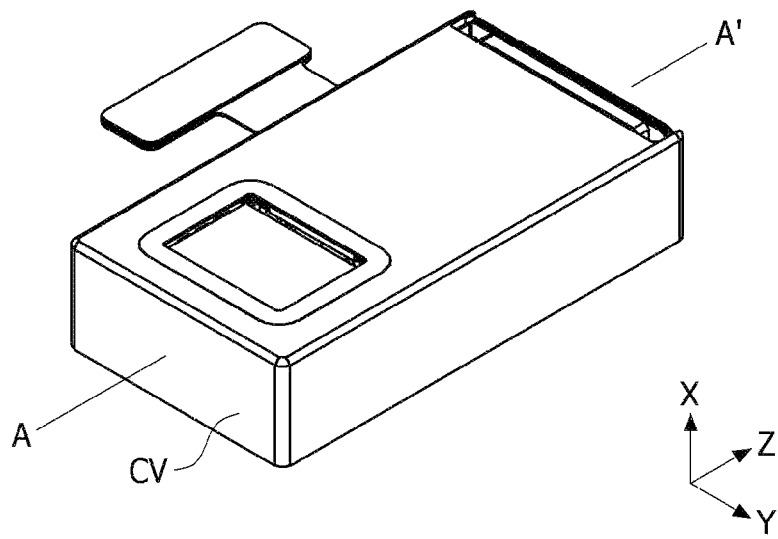
[FIG. 2]
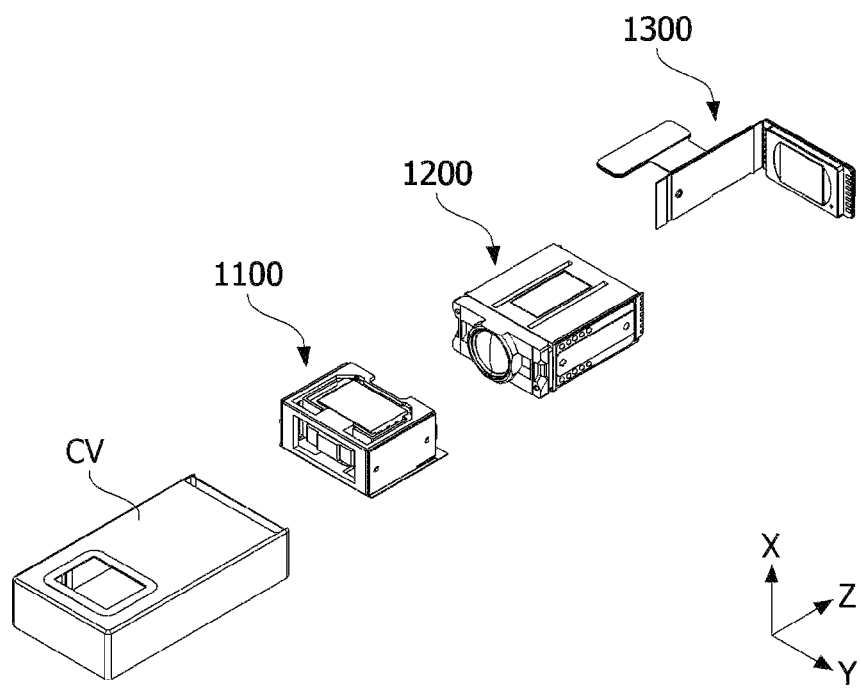

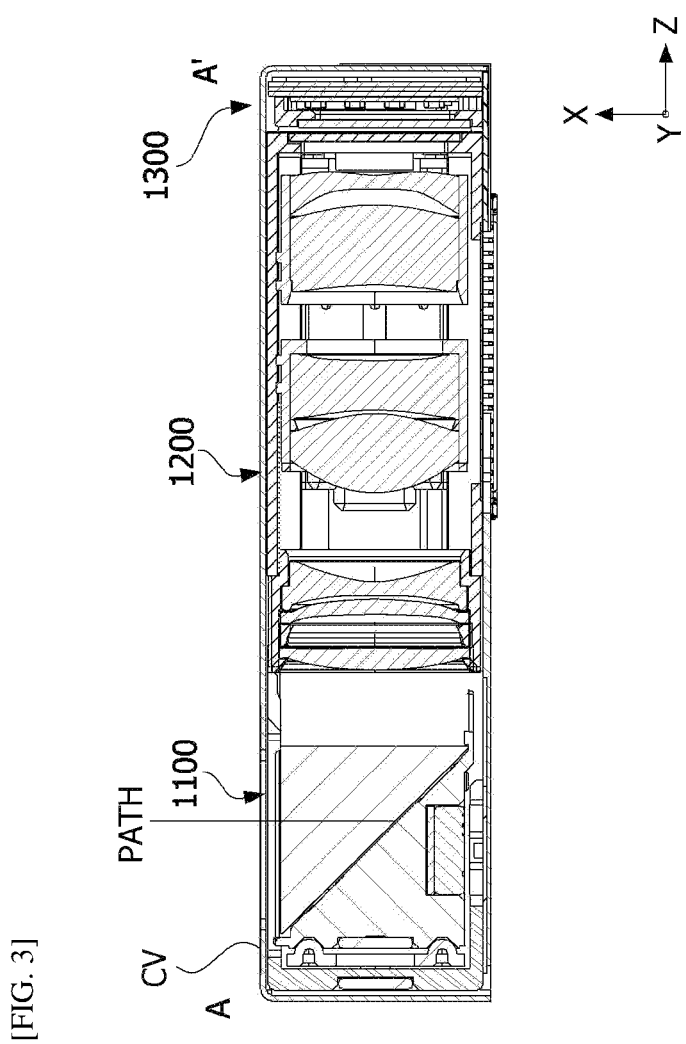
[FIG. 3]

[FIG. 4]
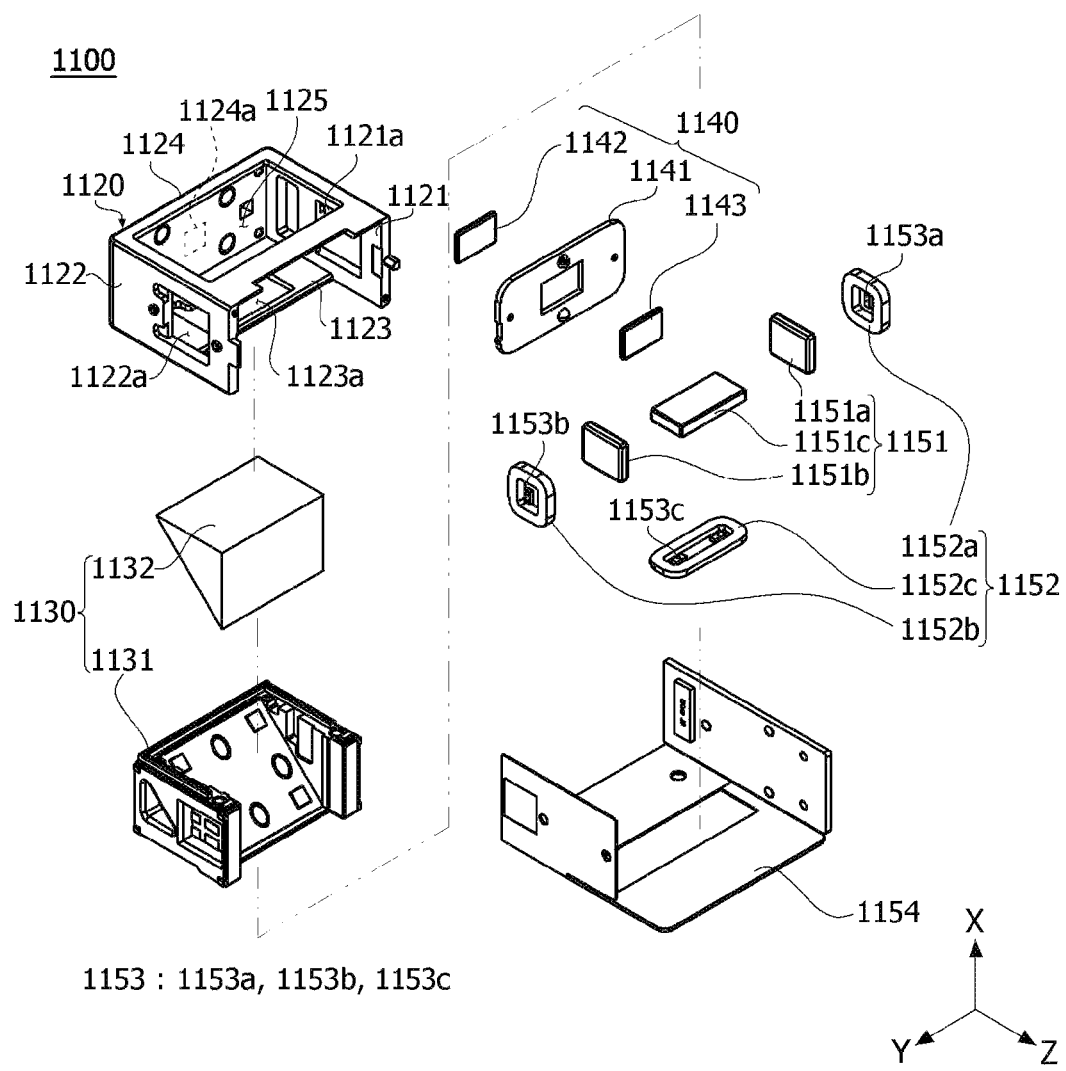
1153 : 1153a, 1153b, 1153c

[FIG. 5]
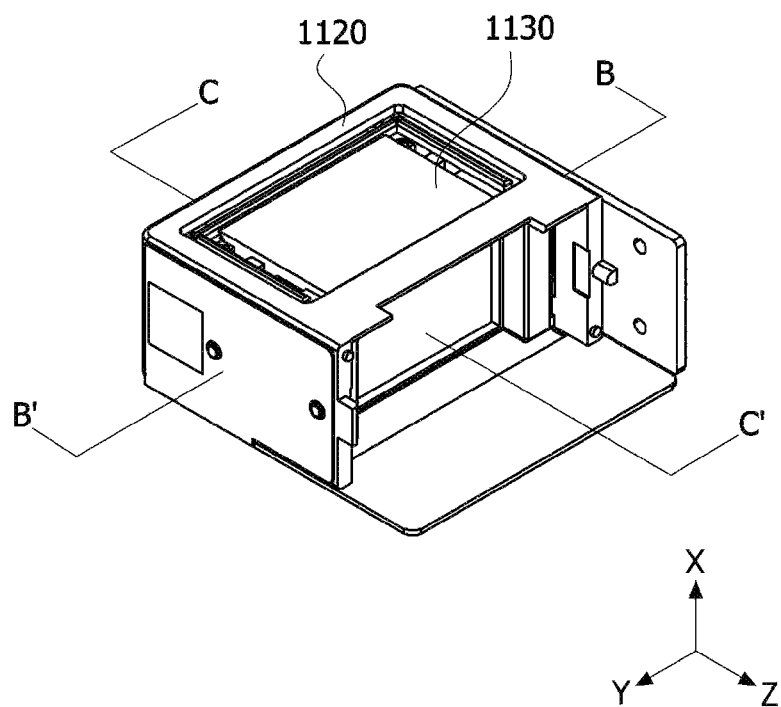

[FIG. 6]
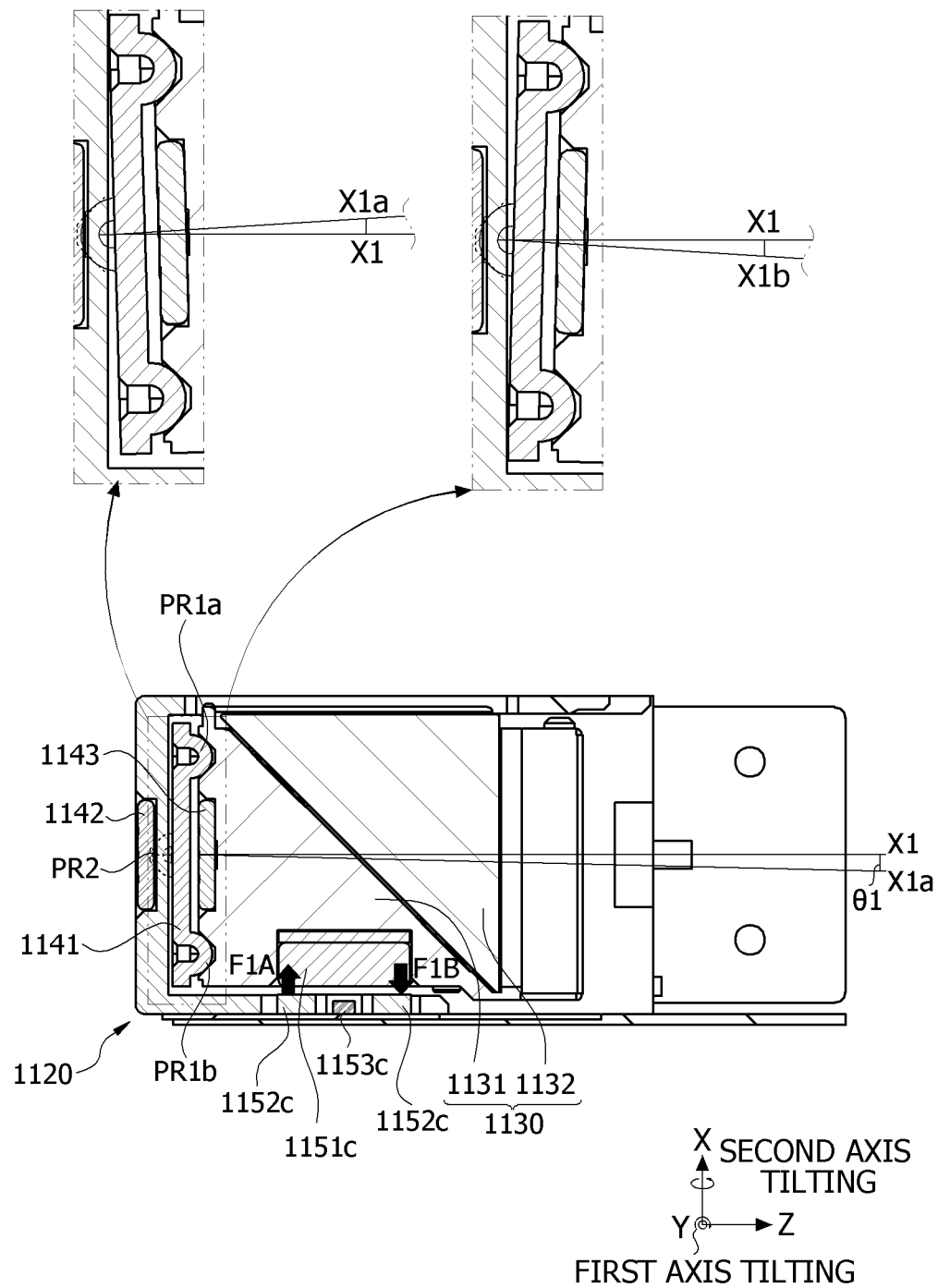

[FIG. 7]
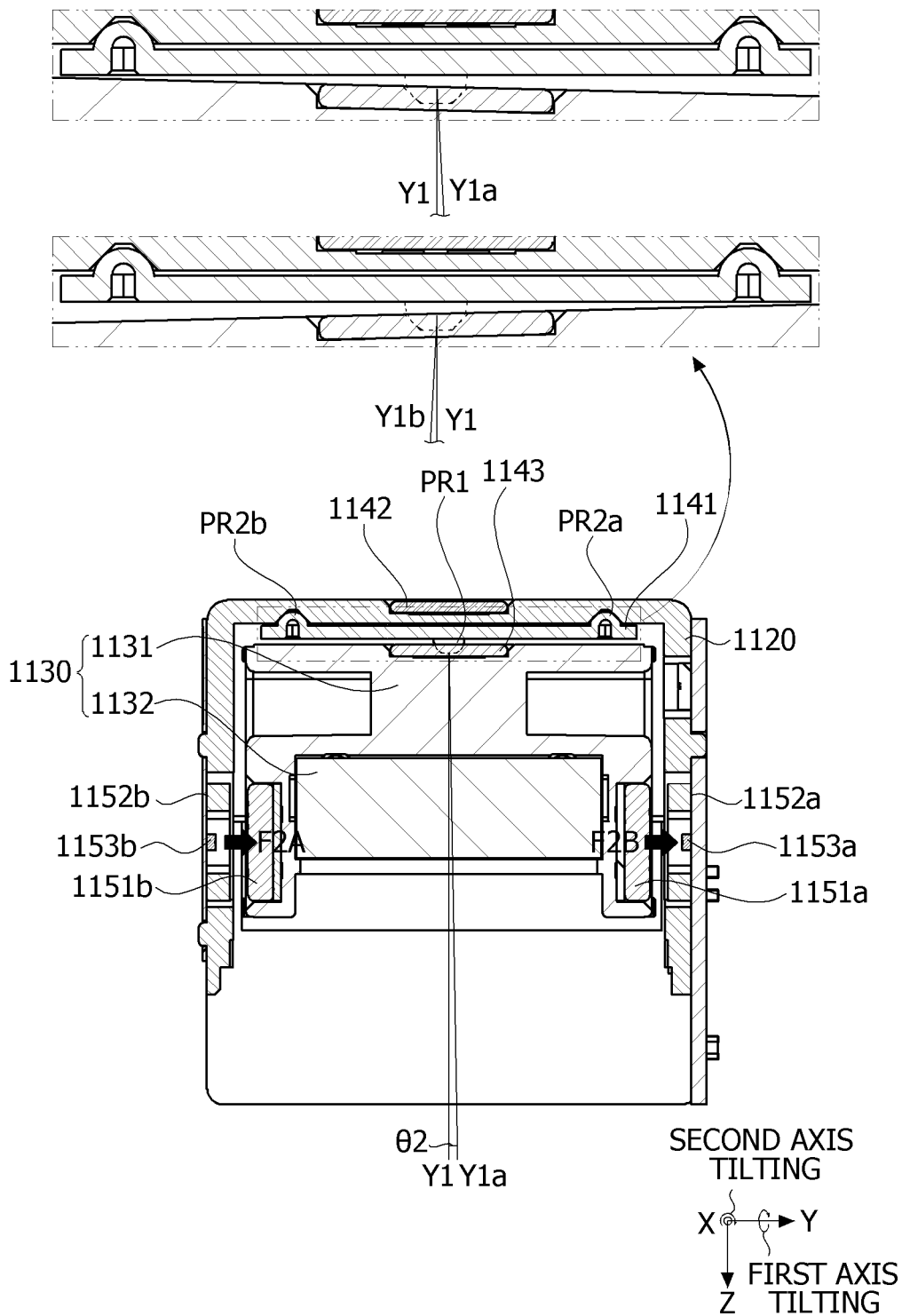

[FIG. 8]
1200
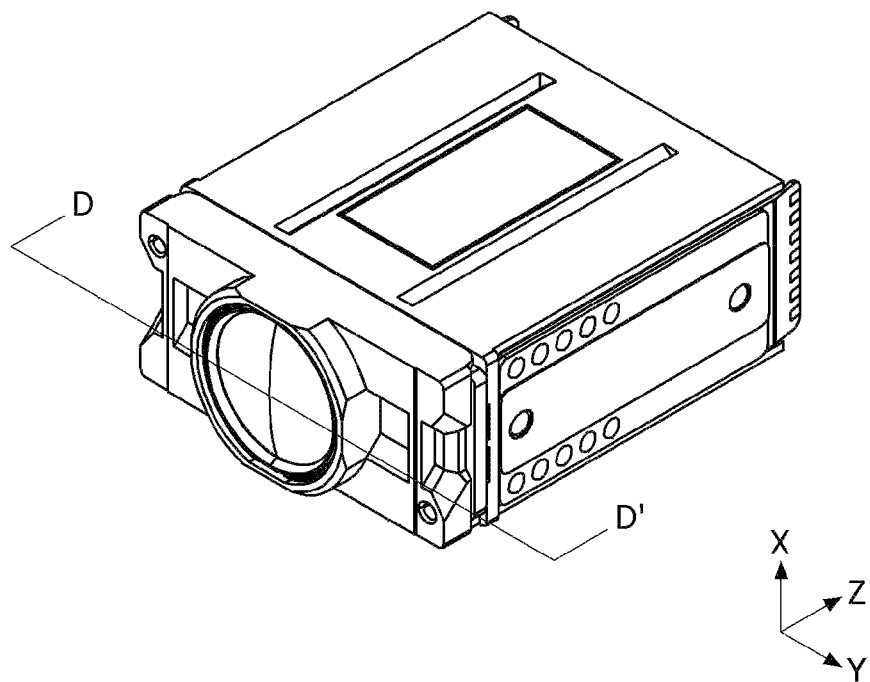

[FIG. 9]
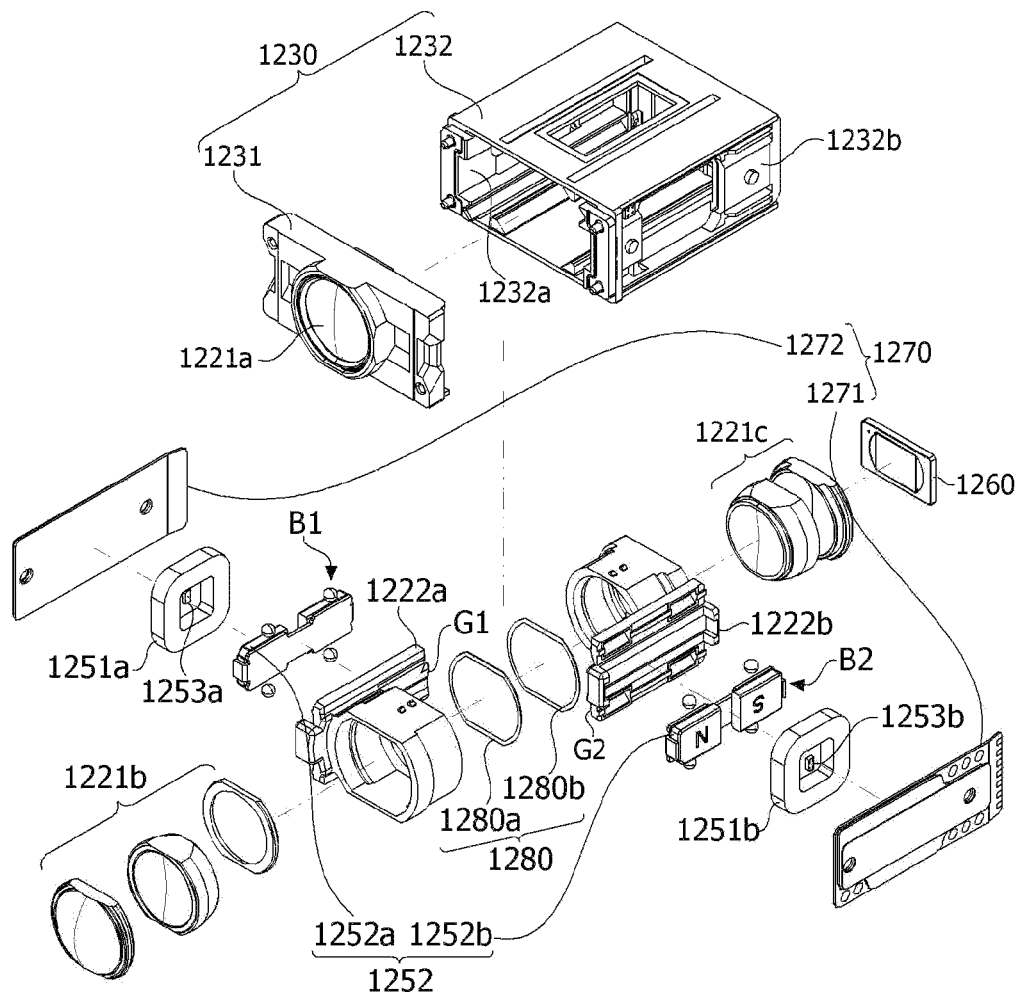
1251: 1251a, 1251b
1221: 1221a, 1221b, 1221c
1222: 1222a, 1222b

[FIG. 10]
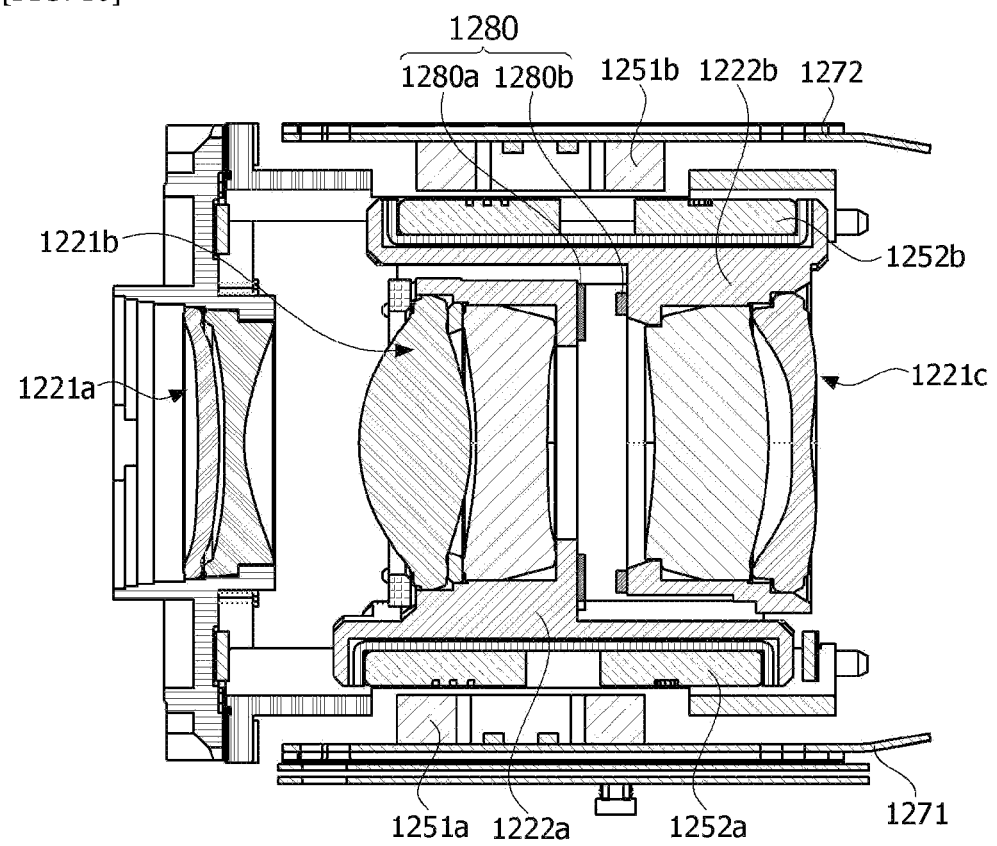

[FIG. 11]
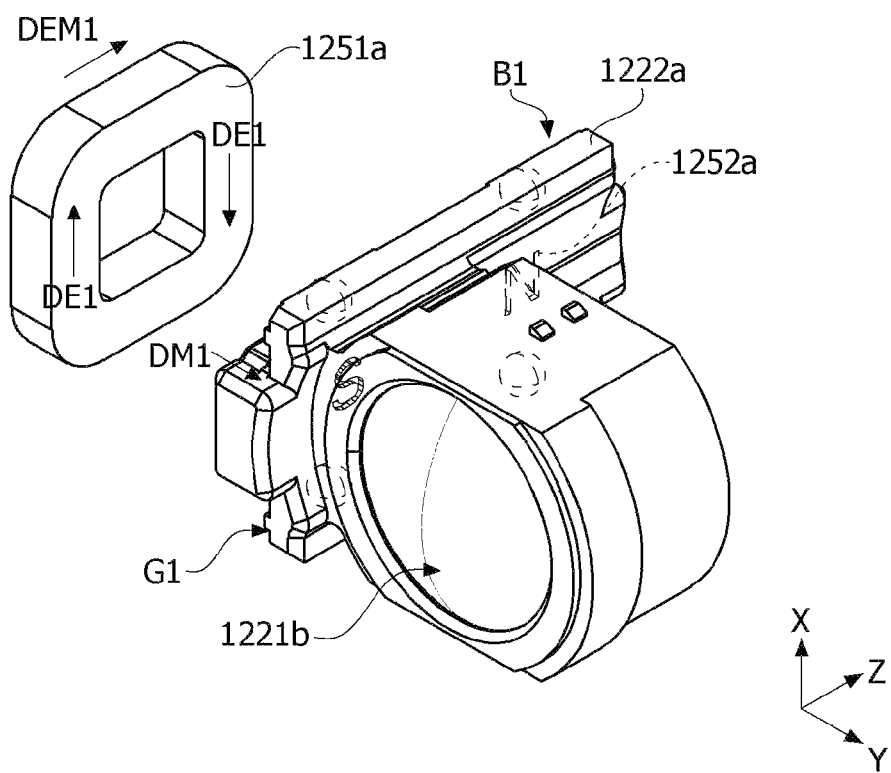

[FIG. 12]
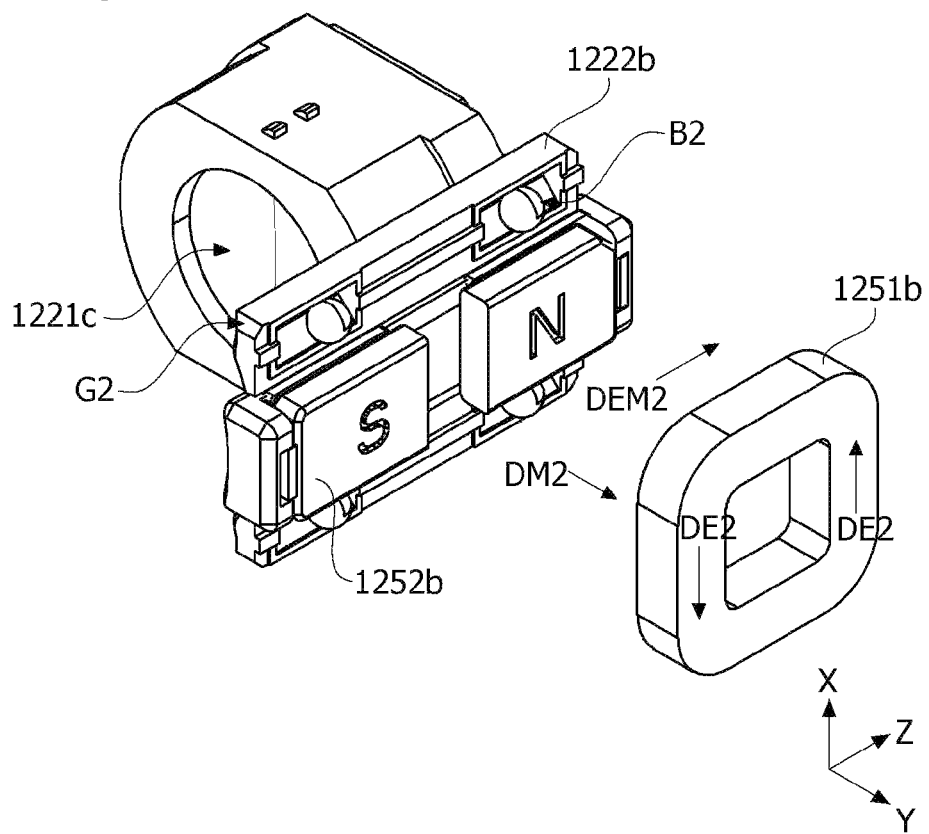

[FIG. 13]
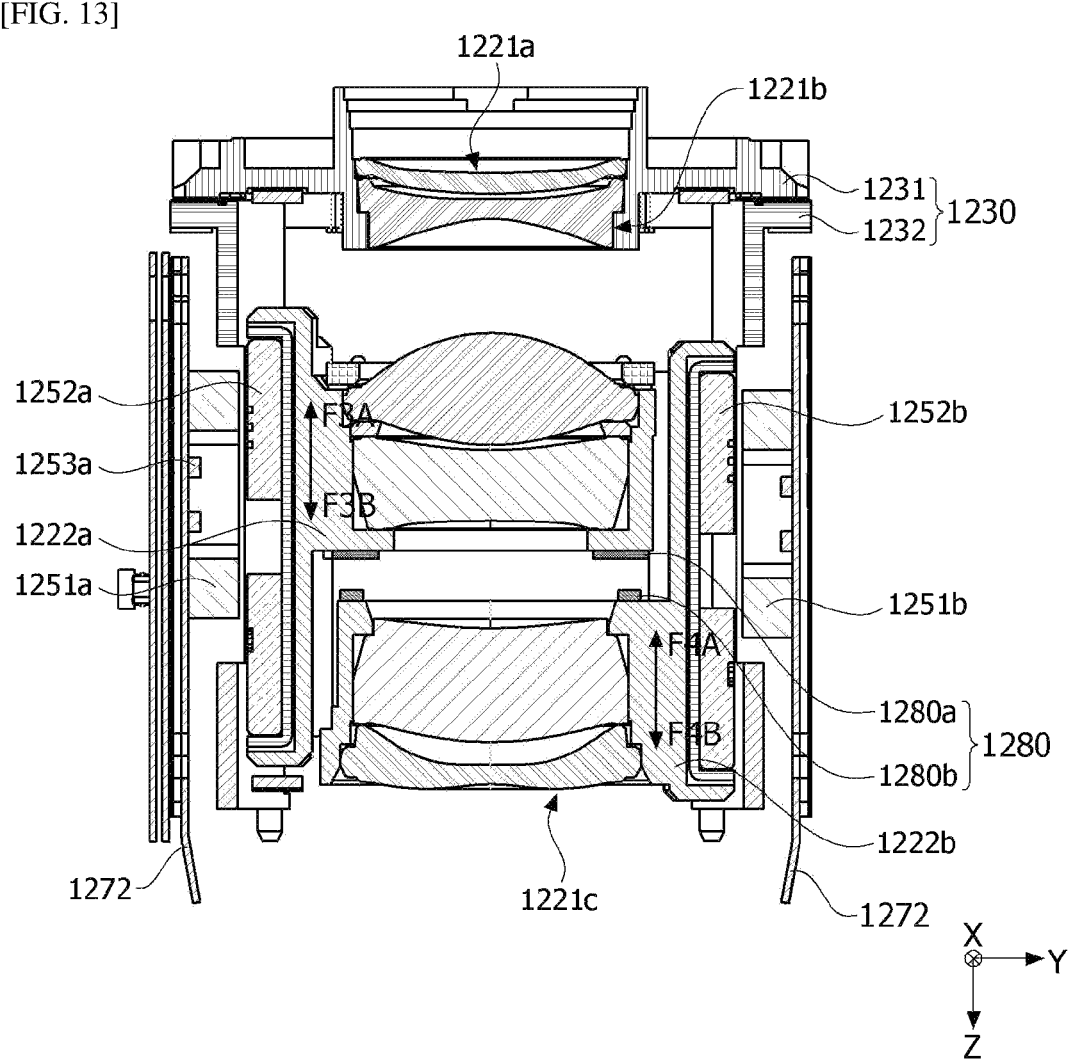

[FIG. 14]
1300
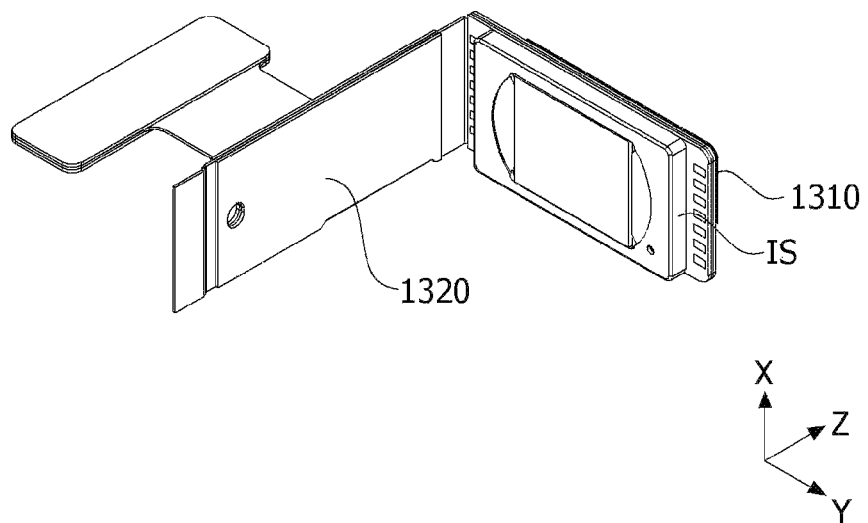
[FIG. 15]
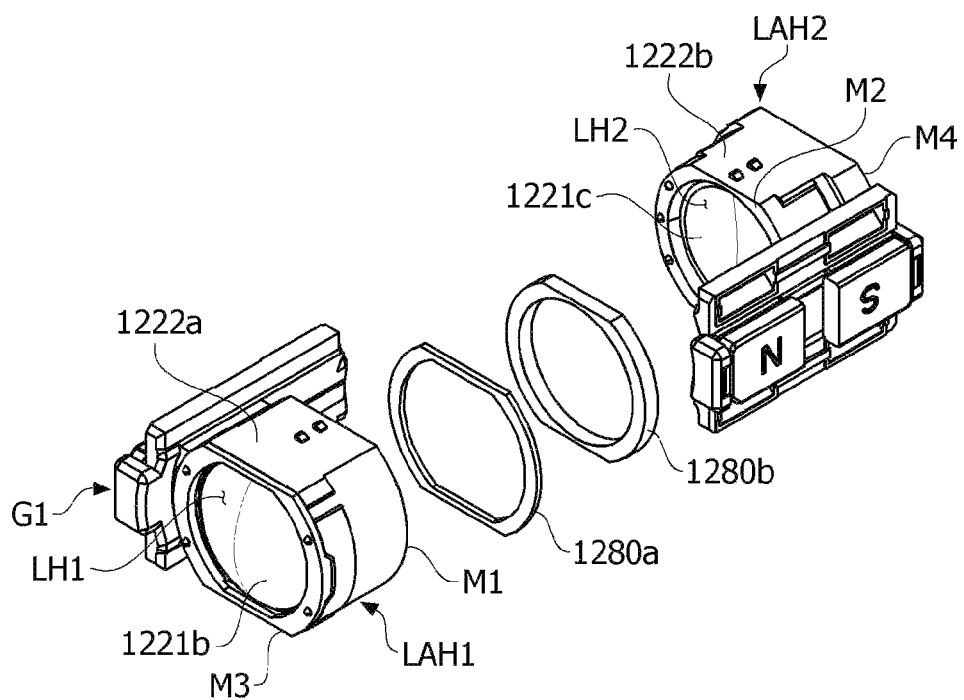

[FIG. 16]
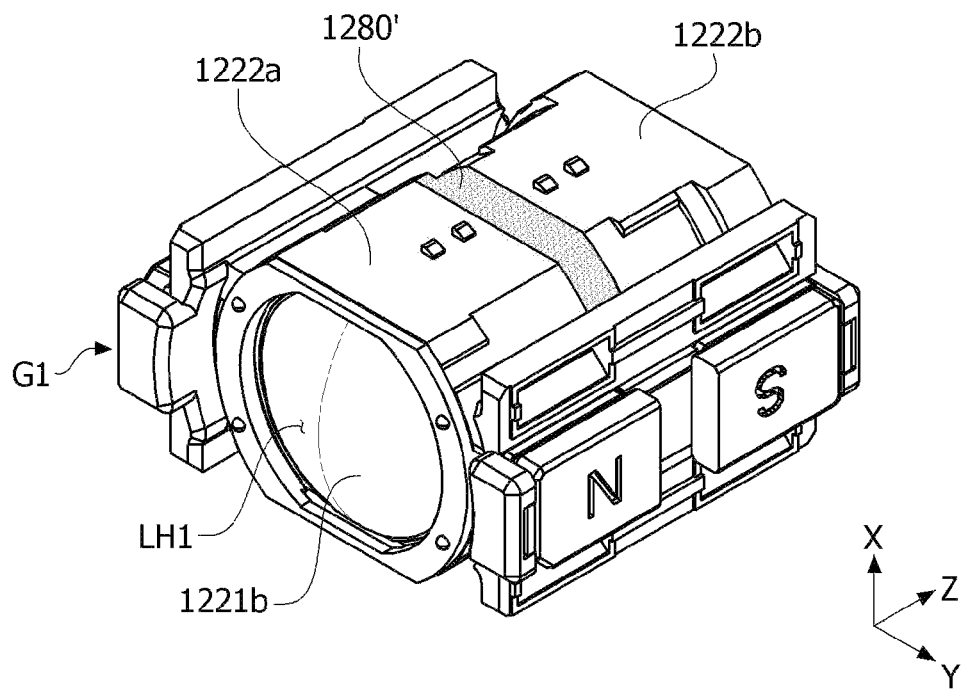

[FIG. 17]
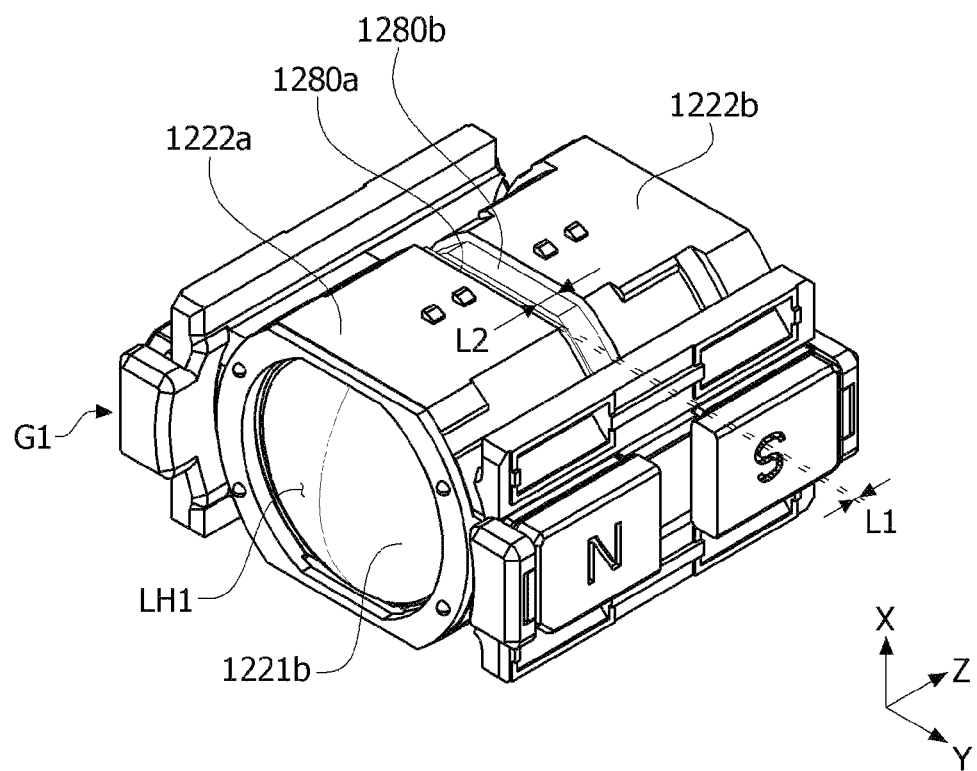

[FIG. 18]
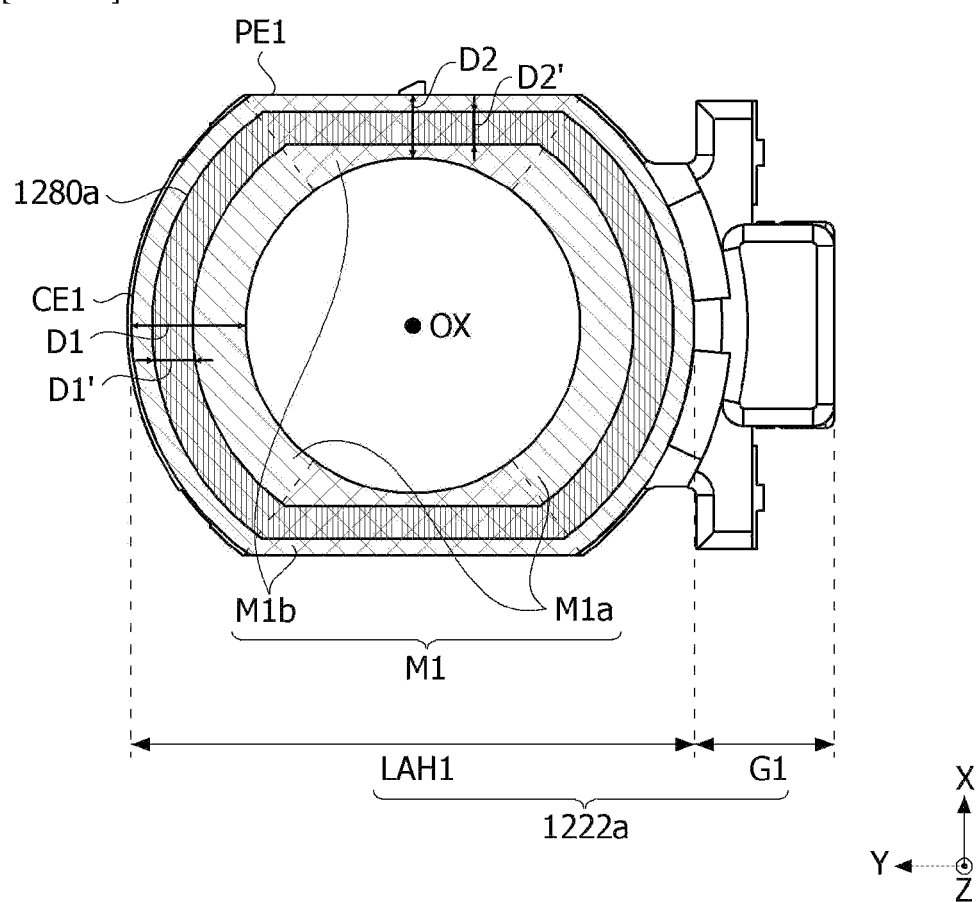

[FIG. 19]
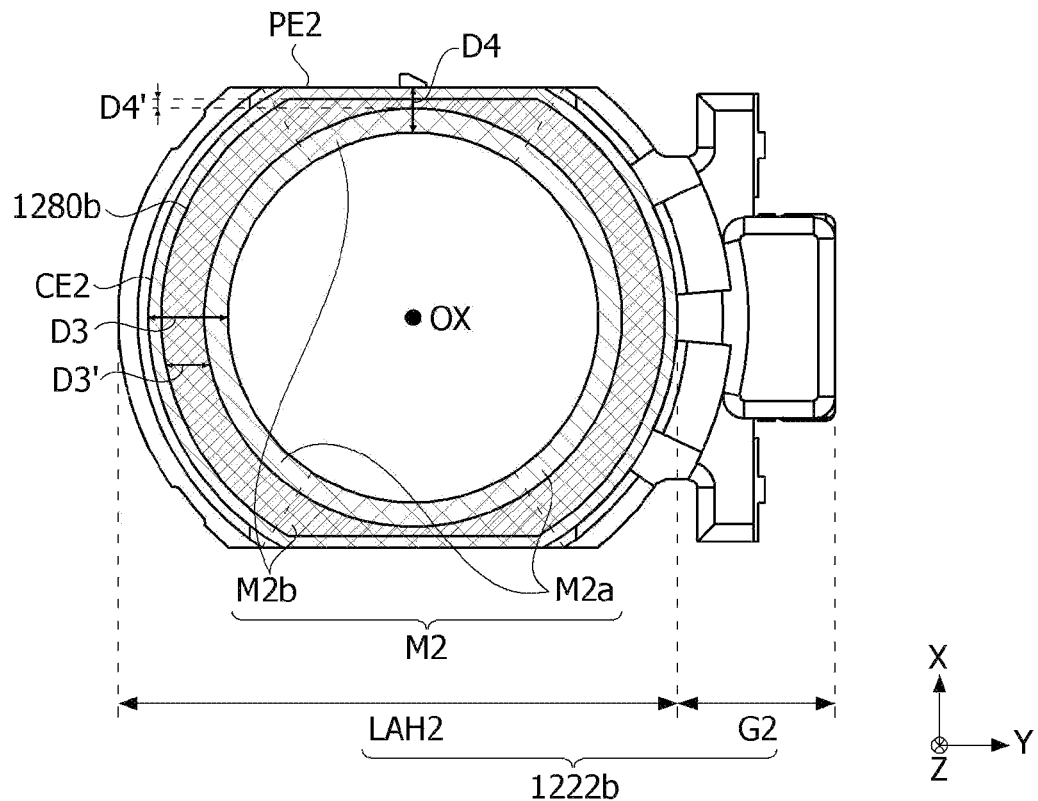
[FIG. 20]
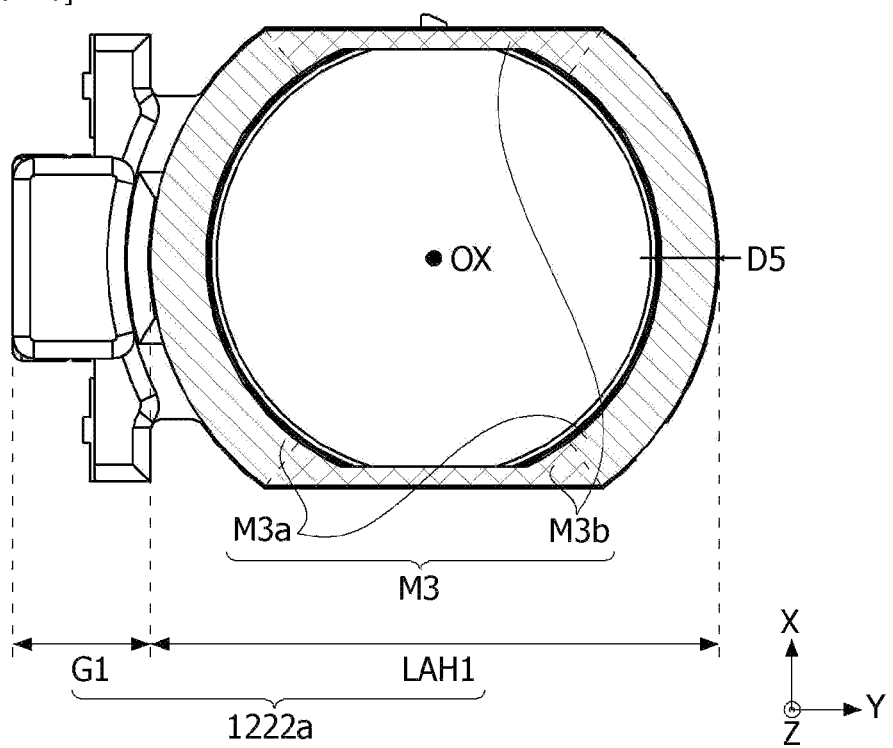

[FIG. 21]
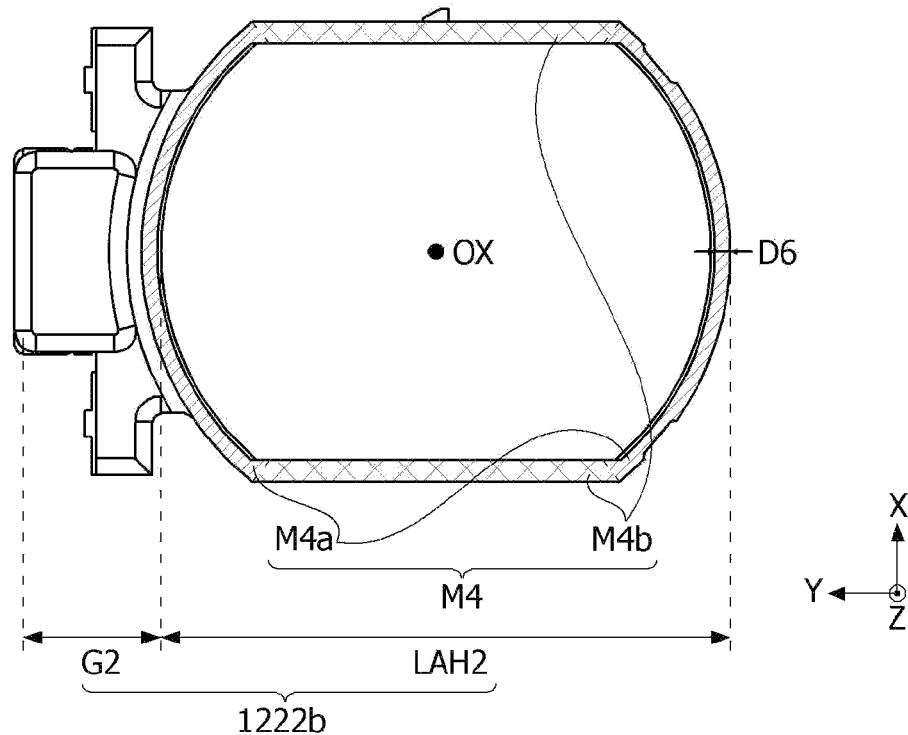
[FIG. 22]
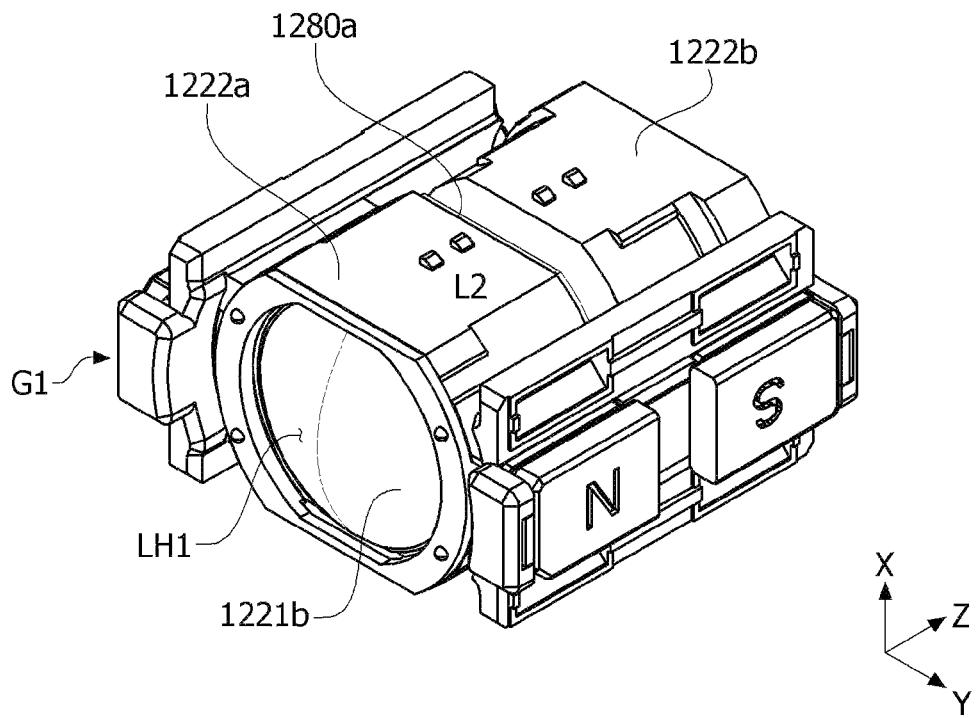

[FIG. 23]
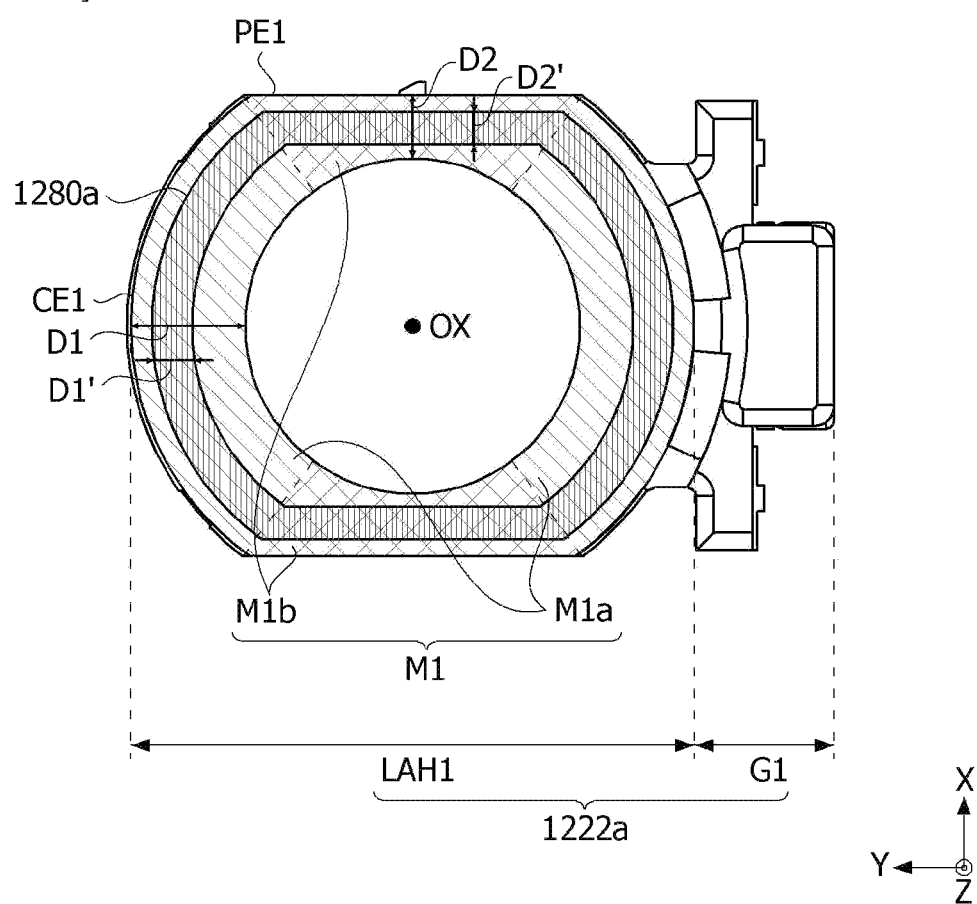

[FIG. 24]
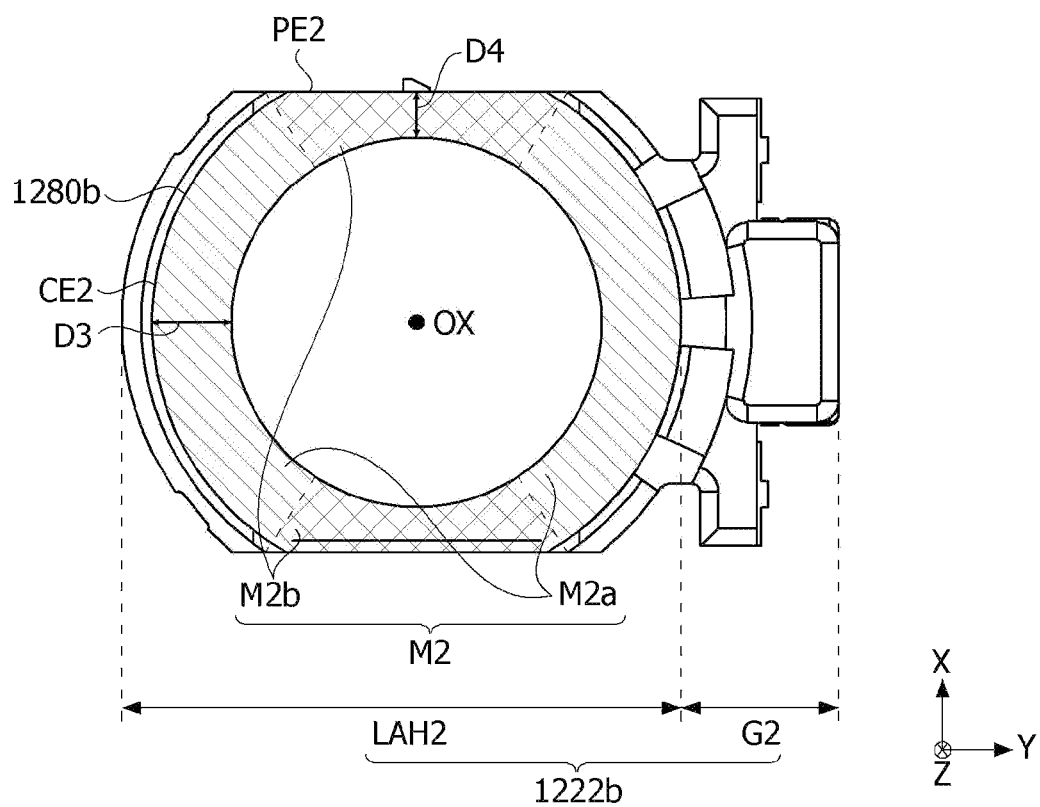

[FIG. 25]
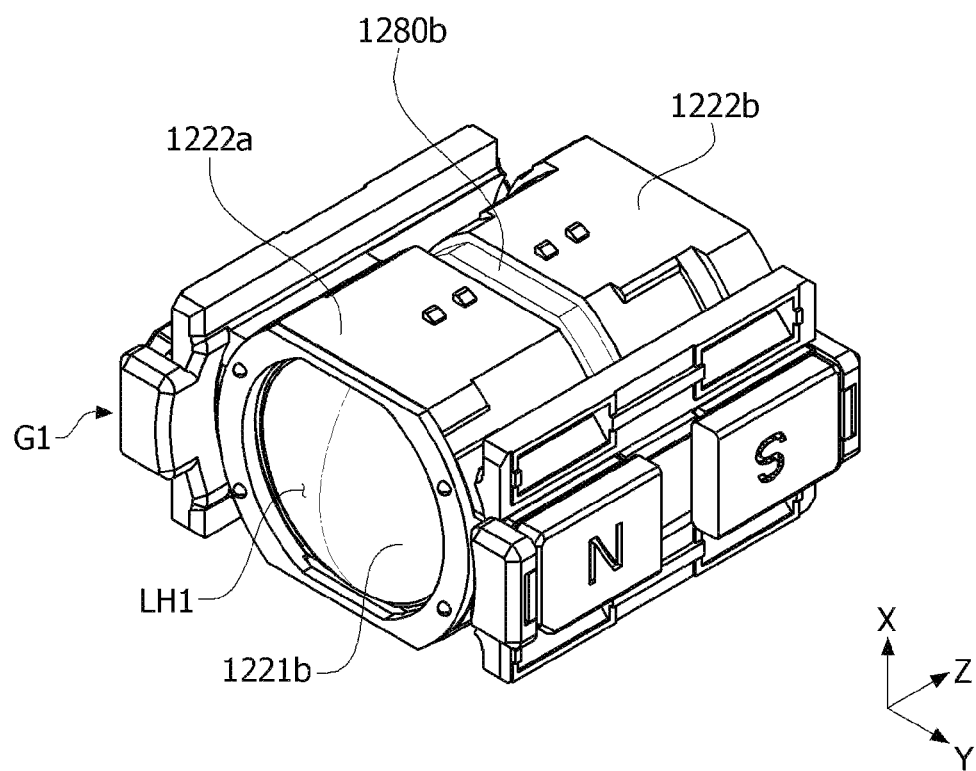

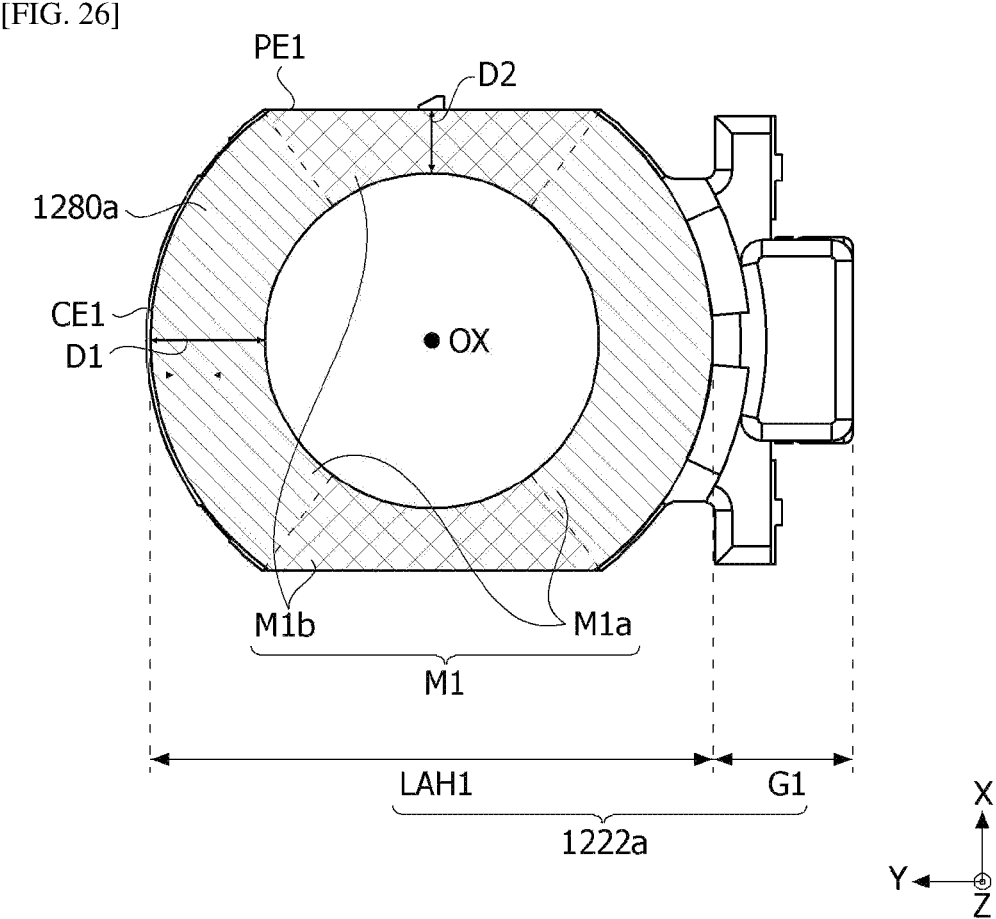
[FIG. 26]

[FIG. 27]
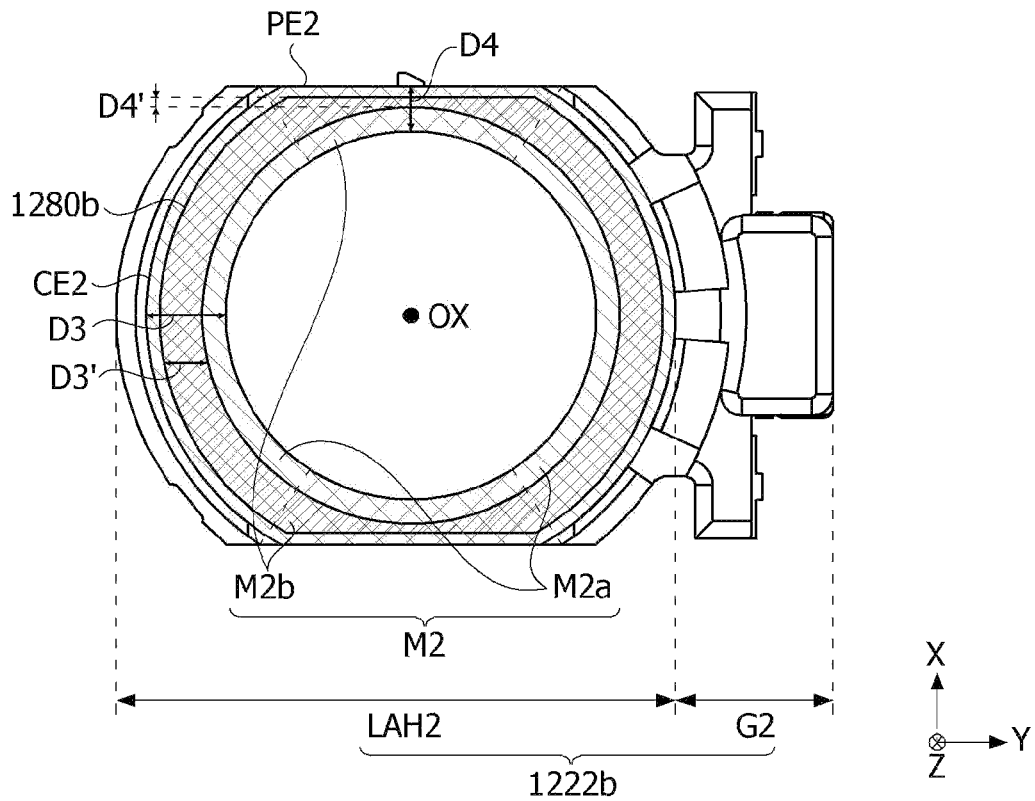
[FIG. 28]
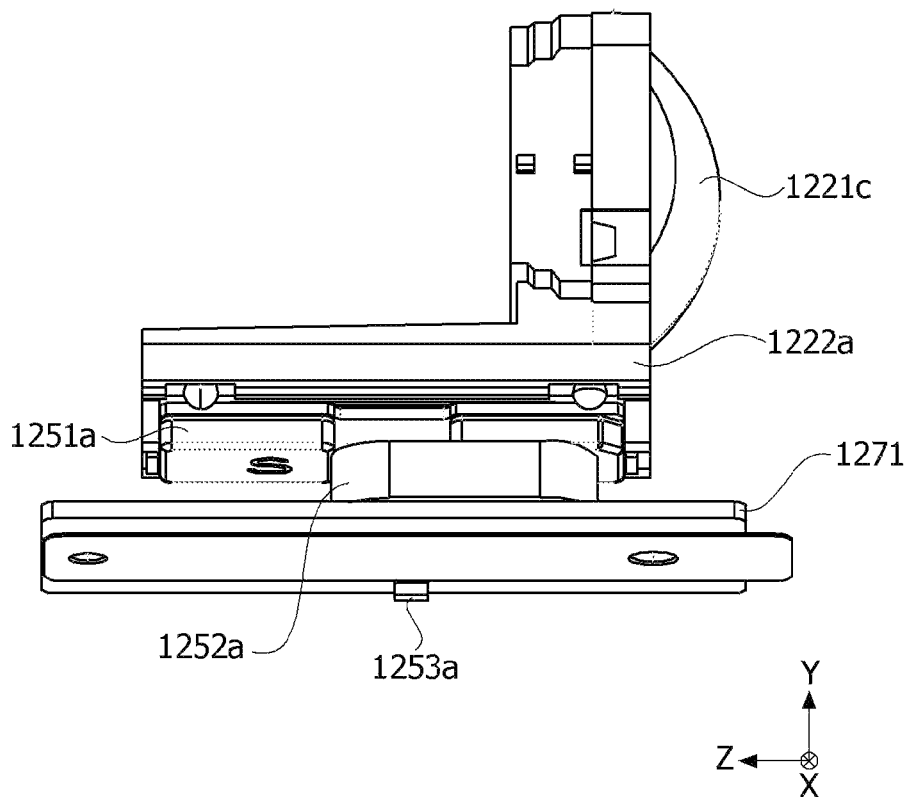

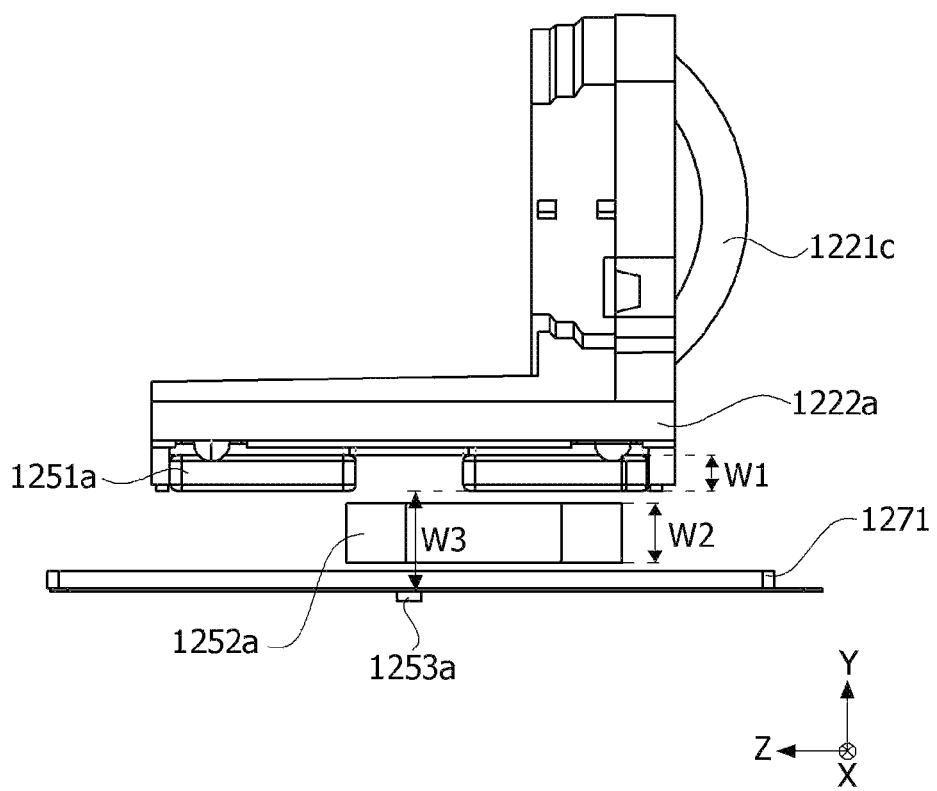
[FIG. 29]

[FIG. 30]
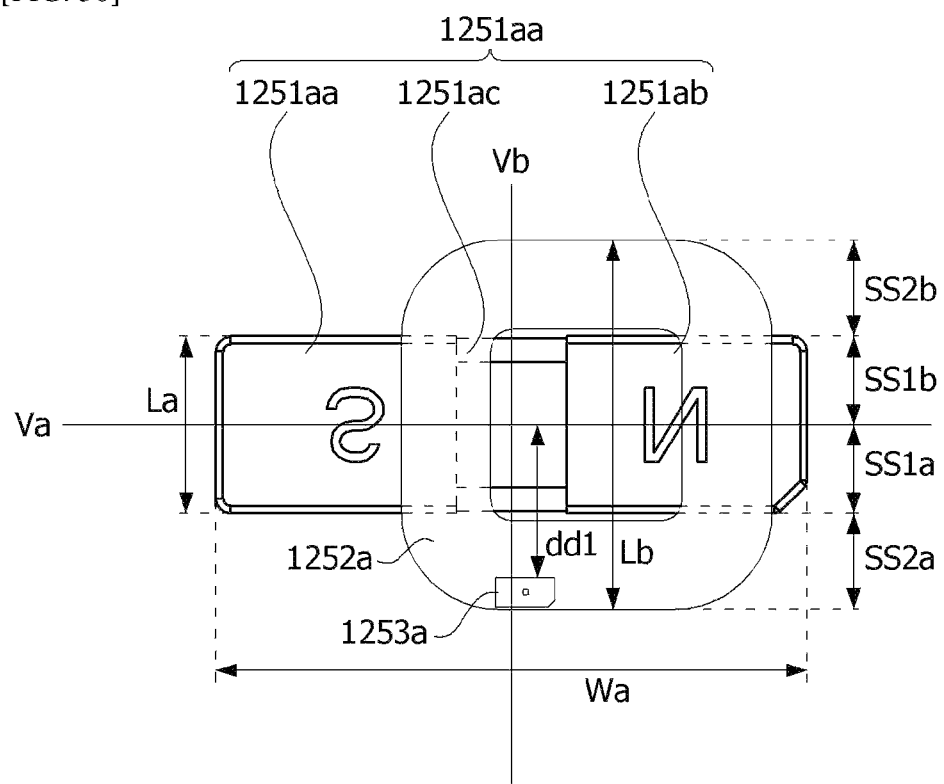

[FIG. 31]
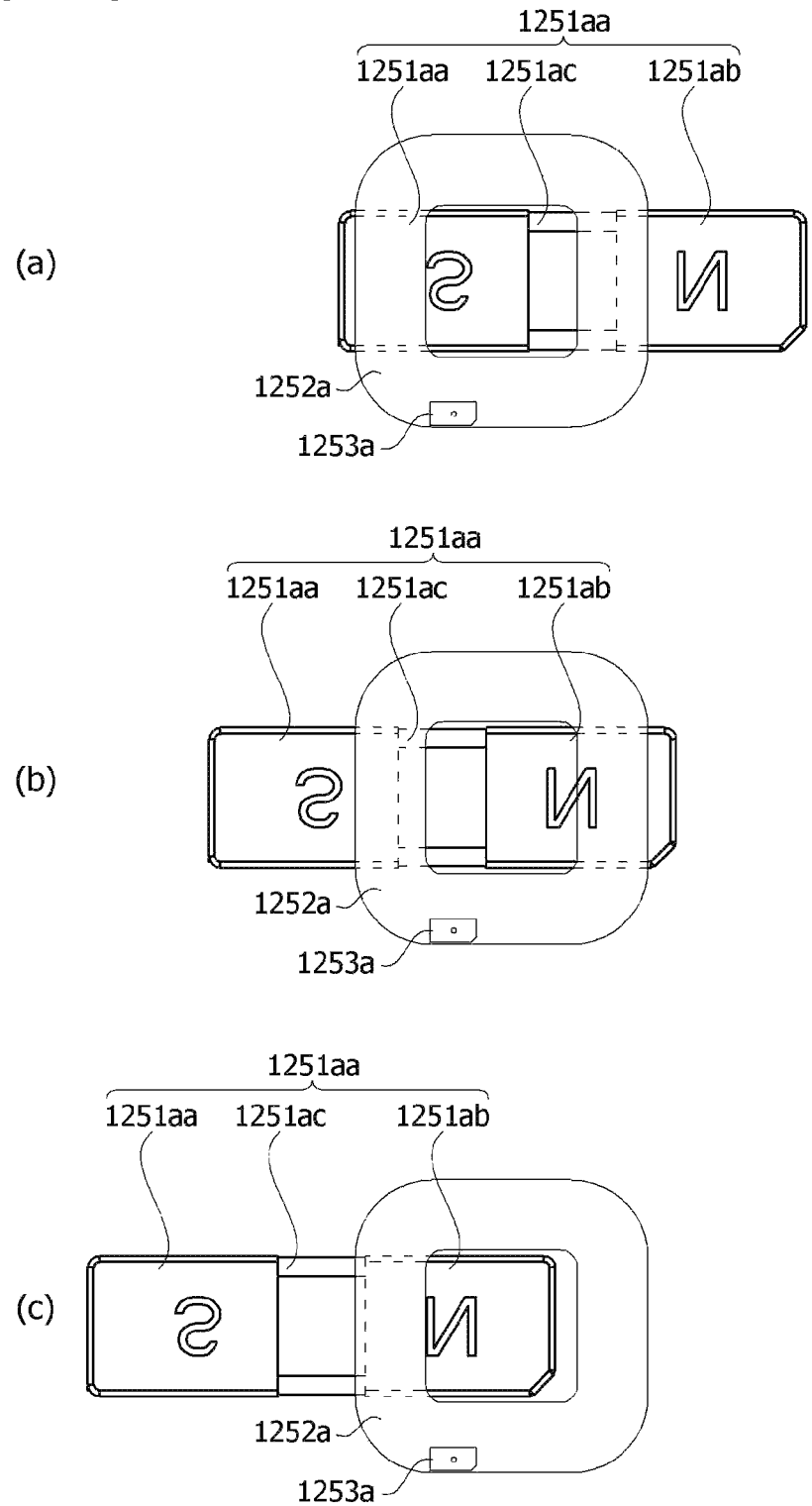

[FIG. 32]
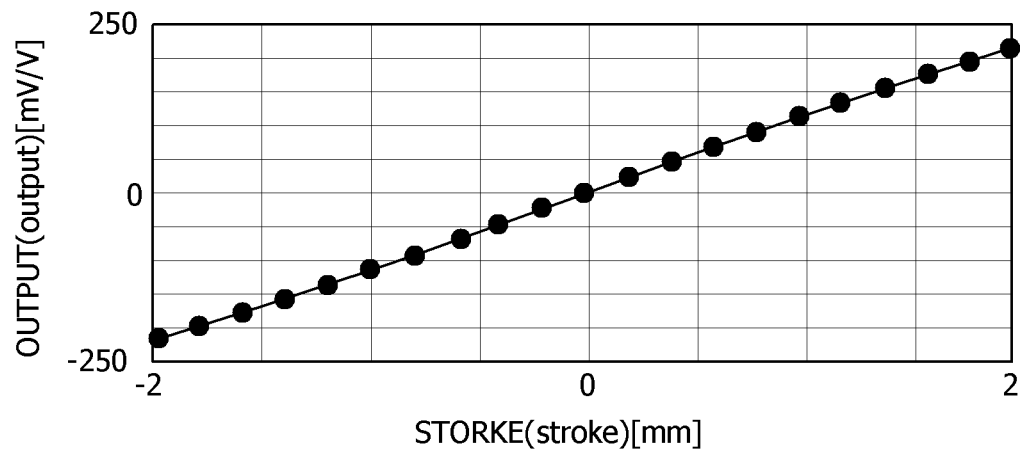
[FIG. 33]
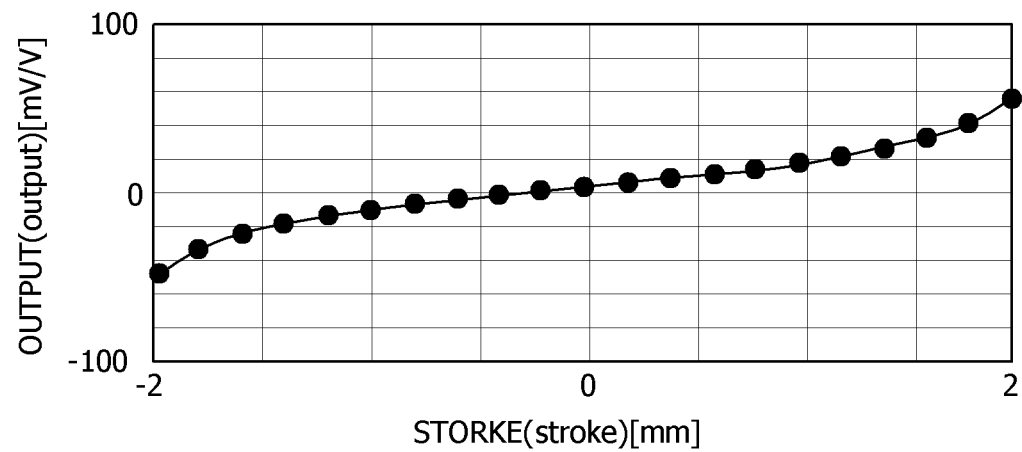
[FIG. 34]
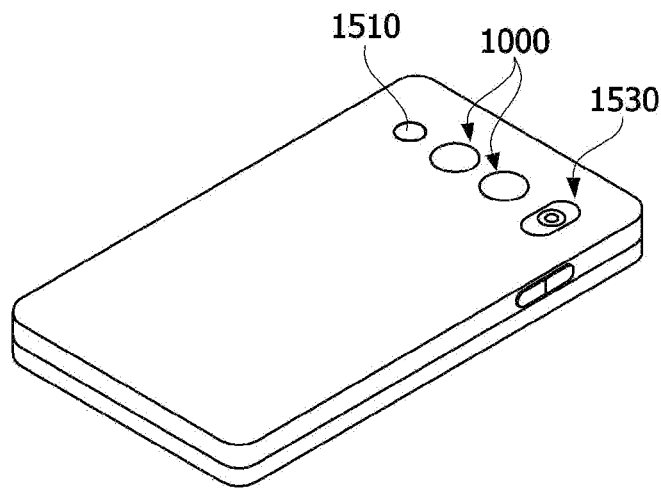

[FIG. 35]
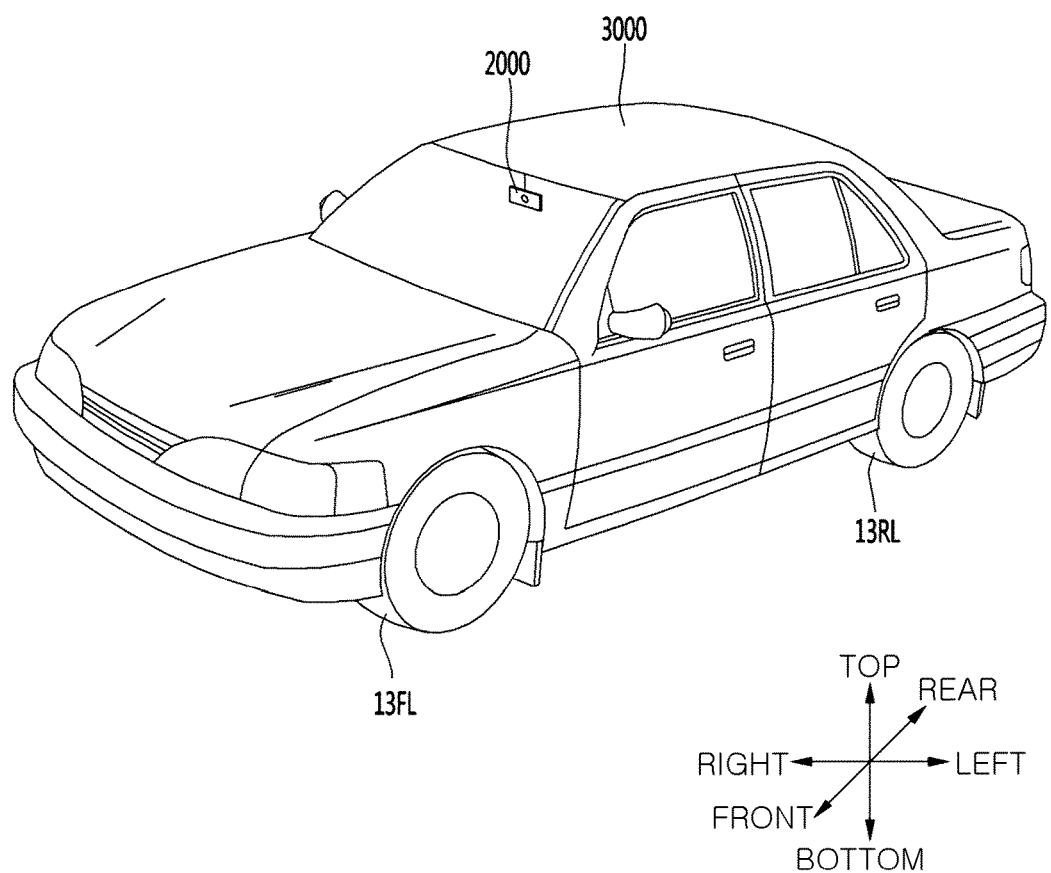

CAMERA ACTUATOR AND CAMERA DEVICE COMPRISING SAME

CROSS-REFERENCE TO RELATED PATENT APPLICATIONS

This application is a U.S. National Stage Application under 35 U.S.C. § 371 of PCT Application No. PCT/KR2021/010591, filed Aug. 10, 2021, which claims priority to Korean Patent Application Nos. 10-2020-0100603, filed Aug. 11, 2020 and 10-2020-0135235, filed Oct. 19, 2020, whose entire disclosures are hereby incorporated by reference.

TECHNICAL FIELD

The present invention relates to a camera actuator and a camera device including the same.

BACKGROUND ART

A camera is a device for taking pictures or videos of subjects and is mounted on a mobile device, a drone, a vehicle, or the like. A camera module may have an image stabilization (IS) function of correcting or preventing the image shake caused by the movement of a user in order to improve the quality of the image, an auto focusing (AF) function of aligning a focal length of a lens by automatically adjusting an interval between an image sensor and the lens, and a zooming function of capturing a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for OIS may be disposed around the lens. In this case, the actuator for OIS may include actuators in charge of two axes (i.e., an X-axis and a Y-axis perpendicular to a Z-axis which is an optical axis) tilting.

However, according to the needs of ultra-slim and ultra-small camera devices, there is a large space constraint for arranging the actuator for OIS, and it may be difficult to secure a sufficient space where the lens or the camera device including the lens and the image sensor itself may be tilted or moved for OIS. In addition, as the camera has a higher pixel density, it is preferable that a size of the lens be increased to increase the amount of received light, and there may be a limit to increasing the size of the lens due to a space occupied by the actuator for OIS.

In addition, when a zooming function, an AF function, and an OIS function are all included in the camera device, there is also a problem that an OIS magnet and an AF or zoom magnet are disposed close to each other to cause magnetic field interference.

Technical Problem

The present invention is directed to providing a camera actuator and a camera device applicable to ultra-slim, ultra-small, and high-resolution cameras.

In addition, the present invention may provide a camera actuator and a camera device that easily perform optical or mechanical alignment of adjacent lens assemblies.

In addition, the present invention may provide a camera actuator and a camera device having improved resistance against an impact occurring when adjacent lens assemblies move in an optical axis direction.

In addition, the present invention may provide a camera actuator having improved accuracy of position detection in a camera actuator for providing a long stroke.

The object of embodiments is not limited thereto and may also include objects or effects that may be identified from the configurations or embodiments to be described below.

Technical Solution

A camera actuator according to an embodiment of the present invention includes a housing, a first lens assembly and a second lens assembly that move in an optical axis direction in the housing, and a driving unit configured to move the first lens assembly and the second lens assembly, wherein the first lens assembly includes a first outer side surface, the second lens assembly includes a second outer side surface facing the first outer side surface and at least partially overlapping the first outer side surface in the optical axis direction, and a bonding member in contact with at least one of the first outer side surface and the second outer side surface.

The bonding member may include a first bonding member in contact with the first outer side surface and a second bonding member in contact with the second outer side surface.

The first bonding member and the second bonding member may not overlap at least partially in the optical axis direction.

A first length of the first bonding member in the optical axis direction may be smaller than a second length of the second bonding member in the optical axis direction.

The first lens assembly may include a first lens hole, the second lens assembly may include a second lens hole, and the camera actuator may further include at least one lens disposed in each of the first lens hole and the second lens hole.

The first outer side surface may include a 1-1 outer region symmetrical in a first direction perpendicular to the optical axis direction and having a curved outer edge and a 1-2 outer region symmetrical in a second direction perpendicular to the first direction and having a flat outer edge.

A first minimum thickness of the 1-1 outer region may be greater than a second minimum thickness of the 1-2 outer region.

The bonding member may be disposed in the 1-1 outer region.

The second outer side surface may include a 2-1 outer region symmetrical in a first direction perpendicular to the optical axis direction and having a curved outer edge and a 2-2 outer region symmetrical in a second direction perpendicular to the first direction and having a flat outer edge.

A third minimum thickness of the 2-1 outer region may be greater than a fourth minimum thickness of the 2-2 outer region.

The bonding member may be in contact with the 2-1 outer region.

The first lens assembly may move within a first moving distance in the optical axis direction, the second lens assembly may move within a second moving distance in the optical axis direction, and the first moving distance may be smaller than the second moving distance.

The first lens assembly may include a third outer side surface opposite to the first outer side surface, and the third outer side surface may include a 3-1 outer region symmetrical in the first direction perpendicular to the optical axis direction and having a curved outer edge and a 3-2 outer region symmetrical in the second direction perpendicular to the first direction and having a flat outer edge.

A first minimum thickness of the 1-1 outer region may be greater than a minimum thickness of the 3-1 outer region.

The second lens assembly may include a fourth outer side surface opposite to the second outer side surface, the fourth outer side surface may include a 4-1 outer region symmetrical in the first direction perpendicular to the optical axis direction and having a curved outer edge; and a 4-2 outer region symmetrical in the second direction perpendicular to the first direction and having a flat outer edge, and a third minimum thickness of the 2-1 outer region may be greater than a minimum thickness of the 4-1 outer region.

A camera device according to an embodiment of the present invention includes a housing, a lens assembly including at least one lens in the housing, and a driving unit configured to move the lens assembly in an optical axis direction, wherein the driving unit includes a driving magnet and a driving coil positioned to face each other and a sensor unit configured to detect a magnetic force from the driving magnet, and the driving coil is disposed between the driving magnet and the sensor unit.

The driving magnet may include a first polarity portion and a second polarity portion having different polarities, the sensor unit may be disposed to be misaligned with a first virtual line, and the first virtual line may be a bisector of the driving magnet in the optical axis direction.

The driving magnet may further include an air gap disposed between the first polarity portion and the second polarity portion.

The driving coil may include a first region overlapping the driving magnet in a direction toward the facing driving magnet and a second region disposed above or under the driving magnet.

The sensor unit may be disposed in the second region.

The sensor unit may not overlap the driving magnet in a direction from the driving magnet toward the driving coil.

The camera device may further include a first side board and a second side board electrically connected to the driving unit and disposed to be spaced apart from each other on facing side surfaces of the housing.

The sensor unit may be disposed on an outer side surface of the first side board or an outer side surface of the second side board.

The driving coil may be disposed on an inner side surface of the first side board or an inner side surface of the second side board.

The sensor unit may further include a main board including a tunnel magnetoresistive effect (TMR) sensor, disposed on a rear end of the lens assembly, and having an image sensor.

A camera module according to an embodiment includes a housing, a lens assembly including at least one lens in the housing, and a driving unit configured to move the lens assembly in an optical axis direction, wherein the driving unit includes a driving magnet and a driving coil positioned to face each other and a sensor unit configured to detect a magnetic force from the driving magnet, and the driving magnet, the driving coil, and the sensor unit are disposed in a direction away from the optical axis and do not overlap one another in the optical axis direction.

Advantageous Effects

Embodiments of the present invention may provide a camera actuator and a camera device applicable to ultra-slim, ultra-small, and high-resolution cameras.

In particular, it is possible to efficiently dispose an actuator for an optical image stabilizer (OIS) even without increasing the overall size of the camera device.

According to embodiments of the present invention, an X-axis tilting and a Y-axis tilting do not cause magnetic field interference, it is possible to implement the X-axis tilting and the Y-axis tilting with a stable structure, and the X-axis tilting and the Y-axis tilting do not cause magnetic field interference with an auto focusing (AF) or zoom actuator, thereby achieving a precise OIS function.

According to embodiments of the present invention, it is possible to secure a sufficient amount of light by overcoming the size limitation of the lens and implement an OIS with low power consumption.

In addition, it is possible to implement a camera actuator with improved accuracy of position detection in a camera actuator for providing a long stroke.

The object of embodiments is not limited thereto and may also include objects or effects that may be identified from the configurations or embodiments to be described below.

DESCRIPTION OF DRAWINGS

FIG. 1 is a perspective view of a camera device according to an embodiment.

FIG. 2 is an exploded perspective view of the camera device according to the embodiment.

FIG. 3 is a cross-sectional view along line A-A' in FIG. 1.

FIG. 4 is an exploded perspective view of a first camera actuator according to an embodiment.

FIG. 5 is a perspective view of the first camera actuator according to the embodiment from which a first shield can and a board are removed.

FIG. 6 is a cross-sectional view along line B-B' in FIG. 5.

FIG. 7 is a cross-sectional view along line C-C' in FIG. 5.

FIG. 8 is a perspective view of a second camera actuator according to the embodiment.

FIG. 9 is an exploded perspective view of the second camera actuator according to the embodiment.

FIG. 10 is a cross-sectional view along line D-D' in FIG. 8.

FIGS. 11 and 12 are views for describing the driving of each lens assembly according to an embodiment.

FIG. 13 is a view showing the driving of the second camera actuator according to an embodiment.

FIG. 14 is a schematic diagram showing a circuit board according to an embodiment.

FIG. 15 is a perspective view of a first lens assembly, a first bonding member, a second bonding member, and a second lens assembly according to an embodiment.

FIG. 16 is a view showing the alignment performed by coupling the first lens assembly and the second lens assembly by the bonding member before separation.

FIG. 17 is a perspective view of the first lens assembly, the first bonding member, the second bonding member, and the second lens assembly according to the embodiment after the bonding member in FIG. 16 is separated.

FIG. 18 is a view showing a first outer side surface of the first lens assembly according to the embodiment.

FIG. 19 is a view showing a second outer side surface of the second lens assembly according to the embodiment.

FIG. 20 is a view showing a third outer side surface of the first lens assembly according to the embodiment.

FIG. 21 is a view showing a fourth outer side surface of the second lens assembly according to the embodiment.

FIG. 22 is a perspective view of a first lens assembly, a first bonding member, and a second lens assembly according to another embodiment.

FIG. 23 is a view showing a first outer side surface of the first lens assembly according to another embodiment.

FIG. 24 is a view showing a second outer side surface of the second lens assembly according to another embodiment.

FIG. 25 is a perspective view of a first lens assembly, a second bonding member, and a second lens assembly according to still another embodiment.

FIG. 26 is a view showing a first outer side surface of the first lens assembly according to still another embodiment.

FIG. 27 is a view showing a second outer side surface of the second lens assembly according to still another embodiment.

FIG. 28 is a perspective view of a first side board, a fourth coil, a fourth magnet, a first sensor, a first lens assembly, and a third lens group in the second camera actuator according to the embodiment.

FIG. 29 is a top view of the first side board, the fourth coil, the fourth magnet, the first sensor, the first lens assembly, and the third lens group in the second camera actuator according to the embodiment.

FIG. 30 is a side view of the fourth magnet, the fourth coil, and the first sensor in the second camera actuator according to the embodiment.

FIG. 31 (a) to (c) are views for describing the positional relationship between the fourth magnet, the fourth coil, and the first sensor according to driving in the second camera actuator according to the embodiment.

FIG. 32 is a view showing the driving of the first sensor overlapping a second region in a second direction in the second camera actuator according to the embodiment.

FIG. 33 is a view showing the driving of the first sensor overlapping a first region in the second direction in the second camera actuator according to the embodiment.

FIG. 34 is a perspective view of a mobile terminal to which the camera device according to the embodiment is applied.

FIG. 35 is a perspective view of a vehicle to which the camera device according to the embodiment is applied.

MODES OF THE INVENTION

Since the present invention may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a certain component is described as being "connected" or "coupled" to another component, it is understood that it may be directly connected or coupled to another component or other components may also be disposed therebetween. On the other hand, when a certain component is described as being "directly connected" or "directly coupled" to another component, it should be understood that other components are not disposed therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are given the same reference numerals regardless of the reference numerals, and overlapping descriptions thereof will be omitted.

FIG. 1 is a perspective view of a camera device according to an embodiment, FIG. 2 is an exploded perspective view of the camera device according to the embodiment, and FIG. 3 is a cross-sectional view along line A-A' in FIG. 1.

Referring to FIGS. 1 and 2, a camera device 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase a coupling force between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

The first camera actuator 1100 may include a fixed focal length lens disposed in a predetermined barrel (not shown).

The fixed focal length lens may also be referred to as "single focal length lens" or "single lens."

The first camera actuator 1100 may change an optical path. In the embodiment, the first camera actuator 1100 may change the optical path vertically through an optical member (e.g., a mirror) therein. With this configuration, even when a thickness of a mobile terminal is decreased, a lens with a focal length that is greater than the thickness of the mobile terminal is disposed in the mobile terminal through a change in the optical path so that zooming, auto focusing (AF), and OIS functions may be performed.

The first camera actuator 1100 may change the optical path from a first direction to a third direction. In the specification, an optical axis direction corresponds to a proceeding direction of light provided to an image sensor in the third direction or a Z-axis direction.

The second camera actuator 1200 may be disposed at a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one or more lenses and perform an AF function or a zooming function by moving the lenses according to a predetermined control signal of a control part.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may have the image sensor. Furthermore, a base unit including a filter may be seated on the circuit board 1300. A description thereof will be given below.

A camera device according to the embodiment may include one or more camera devices. For example, the plurality of camera devices may include a first camera device and a second camera device.

In addition, the first camera device may include one or more actuators. For example, the first camera device may include the first camera actuator 1100 and the second camera actuator 1200.

In addition, the second camera device may include an actuator (not shown) disposed in a predetermined housing (not shown) and capable of driving a lens unit. The actuator may be a voice coil motor, a micro actuator, a silicon actuator, and the like and applied in various methods such as an electrostatic method, a thermal method, a bimorph method, and an electrostatic force method, but the present invention is not limited thereto. In addition, in the specification, a camera actuator may be referred to as an "actuator" or the like. In addition, a camera device composed of a plurality of camera devices may be mounted in various electronic devices such as mobile terminals.

Referring to FIG. 3, the camera device according to the embodiment may include the first camera actuator 1100 for performing the OIS function and the second camera actuator 1200 for performing the zooming function and the AF function.

Light may enter the camera device through an opening region positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and may be incident on an image sensor IS positioned at one end of the second camera actuator 1200 (PATH).

In the specification, the bottom surface refers to one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. In addition, the third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. A description thereof will be given below. In addition, hereinafter, the optical axis direction is a third direction (Z-axis direction) in the description of the second camera actuator 1200 and will be described below based on this.

In addition, with this configuration, the camera device according to the embodiment may reduce the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, the first lens assembly and the second lens assembly may be moving lenses that each moves through the coil, the magnet, and a guide pin, and the third lens assembly may be a fixed lens, but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF actuator or the zoom actuator are disposed according to the embodiment of the present invention, the magnetic field interference with an AF magnet or a zoom magnet can be prevented when an OIS is driven. Since a first driving magnet of the first camera actuator 1100 is disposed separately from the second camera actuator 1200, the magnetic field interference between the first camera actuator 1100 and the second camera actuator 1200 can be prevented. In the specification, an OIS may be used interchangeably with terms such as hand shaking correction, optical image stabilization, optical image correction, shake correction, or the like.

FIG. 4 is an exploded perspective view of the first camera actuator according to the embodiment.

Referring to FIG. 4, the first camera actuator 1100 according to the embodiment includes a first shield can (not shown), a first housing 1120, a mover 1130, a rotational unit 1140, and a first driving unit 1150.

The mover 1130 may include a holder 1131 and an optical member 1132 seated on the holder 1131. The rotational unit 1140 includes a rotational plate 1141, a first magnetic part 1142 having a coupling force with the rotational plate 1141, and a second magnetic part 1143 positioned in the rotational plate 1141. In addition, the first driving unit 1150 includes a first driving magnet 1151, a first driving coil 1152, a first Hall sensor unit 1153, and a first board unit 1154.

The first shield can (not shown) may be positioned at an outermost side of the first camera actuator 1100 and positioned to surround the rotational unit 1140 and the first driving unit 1150, which will be described below.

The first shield can (not shown) may block or reduce the influence of electromagnetic waves generated from the outside. Therefore, it is possible to reduce the number of occurrences of malfunction of the rotational unit 1140 or the first driving unit 1150.

The first housing 1120 may be positioned in the first shield can (not shown). In addition, the first housing 1120 may be positioned inside the first board unit 1154 to be described below. The first housing 1120 may be fastened by being fitted into or engaged with the first shield can (not shown).

The first housing 1120 may be composed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower portion of the first housing 1120 and include a bottom surface thereof.

In addition, the first housing side portion 1121 may include a first housing hole 1121a. A first coil 1153a to be described below may be positioned in the first housing hole 1121a.

In addition, the second housing side portion 1122 may include a second housing hole 1122a. In addition, a second coil 1153b to be described below may be positioned in the second housing hole 1122a.

The first coil 1153a and the second coil 1153b may be coupled to the first board unit 1154. In an embodiment, the first coil 1153a and the second coil 1153b may be electrically connected to the first board unit 1154 so that a current may flow therethrough. The current is an element of an electromagnetic force by which the first camera actuator may tilt with respect to an X-axis.

In addition, the third housing side portion 1123 may include a third housing hole 1123a. A third coil 1153c to be described below may be positioned in the third housing hole 1123a. The third coil 1153c may be coupled to the first board unit 1154. Further, the third coil 1153c may be electrically connected to the first board unit 1154 so that a current may flow therethrough. The current is an element of the electromagnetic force by which the first camera actuator may tilt with respect to a Y-axis.

The fourth housing side portion 1124 may include a first housing groove 1124a. The first magnetic part 1142 to be described below may be disposed in a region facing the first housing groove 1124a. Therefore, the first housing 1120 may be coupled to the rotational plate 1141 by a magnetic force or the like.

In addition, the first housing groove 1124a according to the embodiment may be positioned on an inner side surface or an outer side surface of the fourth housing side portion 1124. Therefore, the first magnetic part 1142 may also be disposed to correspond to a position of the first housing groove 1124a.

In addition, the first housing 1120 may include an accommodating portion 1125 formed by the first to fourth housing side portions 1121 to 1224. The mover 1130 may be positioned in the accommodating portion 1125.

The mover 1130 includes the holder 1131 and the optical member 1132 seated on the holder 1131.

The holder 1131 may be seated in the accommodating portion 1125 of the first housing 1120. The holder 1131 may include a first prism outer side surface to a fourth prism outer side surface respectively corresponding to the first housing side portion 1121, the second housing side portion 1122, the third housing side portion 1123, and the fourth housing side portion 1124.

A seating groove in which the second magnetic part 1143 may be seated may be disposed on the fourth prism outer side surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera device. In other words, the optical member 1132 can reduce spatial limitations of the first camera actuator and the second camera actuator by changing the path of the reflected light. As described above, it should be understood that the camera device may also provide a high magnification by extending an optical path while minimizing a thickness thereof.

The rotational unit 1140 includes the rotational plate 1141, the first magnetic part 1142 having a coupling force with the rotational plate 1141, and the second magnetic part 1143 positioned on the rotational plate 1141.

The rotational plate 1141 may be coupled to the mover 1130 and the first housing 1120. The rotational plate 1141 may include an additional magnetic part (not shown) positioned therein.

In addition, the rotational plate 1141 may be disposed adjacent to the optical axis. Therefore, the actuator according to the embodiment may easily change the optical path according to first axis tilting and second axis tilting, which will be described below.

The rotational plate 1141 may include first protrusions disposed to be spaced apart from each other in a first direction (X-axis direction) and second protrusions disposed to be spaced apart from each other in a second direction (Y-axis direction). In addition, the first protrusion and the second protrusion may protrude in opposite directions. A description thereof will be given below.

In addition, the first magnetic part 1142 may include a plurality of yokes, and the plurality of yokes may be positioned to face each other with respect to the rotational plate 1141. In an embodiment, the first magnetic part 1142 may include a plurality of facing yokes. In addition, the rotational plate 1141 may be positioned between the plurality of yokes.

As described above, the first magnetic part 1142 may be positioned in the first housing 1120. In addition, as described above, the first magnetic part 1142 may be seated on the inner or outer side surface of the fourth housing side portion 1124. For example, the first magnetic part 1142 may be seated in a groove formed on the outer side surface of the fourth housing side portion 1124. Alternatively, the first magnetic part 1142 may be seated in the first housing groove 1124a.

In addition, the second magnetic part 1143 may be positioned on the mover 1130, particularly, an outer side surface of the holder 1131. With this configuration, the rotational plate 1141 may be easily coupled to the first housing 1120 and the mover 1130 by a coupling force generated by a magnetic force between the second magnetic part 1143 and the first magnetic part 1142 therein. In the present invention, positions of the first magnetic part 1142 and the second magnetic part 1143 may be changed.

The first driving unit 1150 includes the first driving magnet 1151, the first driving coil 1152, the first Hall sensor unit 1153, and the first board unit 1154.

The first driving magnet 1151 may include a plurality of magnets. In an embodiment, the first driving magnet 1151 may include a first magnet 1151a, a second magnet 1151b, and a third magnet 1151c.

Each of the first magnet 1151a, the second magnet 1151b, and the third magnet 1151c may be positioned on the outer side surface of the holder 1131. In addition, the first magnet 1151a and the second magnet 1151b may be positioned to face each other. In addition, the third magnet 1151c may be positioned on a bottom surface of the outer side surface of the holder 1131. A description thereof will be given below.

The first driving coil 1152 may include a plurality of coils. In an embodiment, the first driving coil 1152 may include the first coil 1153a, the second coil 1153b, and the third coil 1153c.

The first coil 1153a may be positioned to face the first magnet 1151a. Therefore, the first coil 1153a may be positioned in the first housing hole 1121a of the first housing side portion 1121 as described above.

In addition, the second coil 1153b may be positioned to face the second magnet 1151b. Therefore, the second coil 1153b may be positioned in the second housing hole 1122a of the second housing side portion 1122 as described above.

The first coil 1153a may be positioned to face the second coil 1153b. In other words, the first coil 1153a may be positioned to be symmetrical to the second coil 1153b with respect to the first direction (X-axis direction). This may also be applied to the first magnet 1151a and the second magnet 1151b in the same manner. In other words, the first magnet 1151a and the second magnet 1151b may be positioned symmetrically with respect to the first direction (X-axis direction). In addition, the first coil 1153a, the second coil 1153b, the first magnet 1151a, and the second magnet 1151b may be disposed to overlap at least partially in the second direction (Y-axis direction). With this configuration, X-axis tilting may be accurately performed without inclination to one side by an electromagnetic force between the first coil 1153a and the first magnet 1151a and an electromagnetic force between the second coil 1153b and the second magnet 1151b.

The third coil 1153c may be positioned to face the third magnet 1151c. Therefore, the third coil 1153c may be positioned in the third housing hole 1123a of the third housing side portion 1123 as described above. The third coil 1153c generates an electromagnetic force with the third magnet 1151c so that the mover 1130 and the rotational unit 1140 may perform Y axis tilting with respect to the first housing 1120.

Here, the X-axis tilting refers to tilting based on the X-axis, and the Y-axis tilting refers to tilting based on the Y-axis.

The first Hall sensor unit 1153 may include a plurality of Hall sensors. The Hall sensor corresponds to "sensor" described below and is used interchangeably therewith. In an embodiment, the first Hall sensor unit 1153 may include a first Hall sensor 1153a, a second Hall sensor 1153b, and a third Hall sensor 1153c.

The first Hall sensor 1153a may be positioned inside the first coil 1153a. The second Hall sensor 1153b may be disposed to be symmetrical with the first Hall sensor 1153a with respect to the first direction (X-axis direction) and the third direction (Z-axis direction). In addition, the second Hall sensor 1153b may be positioned inside the second coil 1153b.

The first Hall sensor 1153a may detect a change in magnetic flux inside the first coil 1153a. In addition, the second Hall sensor 1153b may detect a change in magnetic flux in the second coil 1153b. Therefore, positions between the first and second magnets 1151a and 1151b and the first and second Hall sensors 1153a and 1153b may be sensed. For example, the first camera actuator according to the embodiment may control X-axis tilting through the first and second Hall sensors 1153a and 1153b.

In addition, the third Hall sensor 1153c may be positioned inside the third coil 1153c. The third Hall sensor 1153c may detect a change in magnetic flux inside the third coil 1153c. Therefore, a position between the third magnet 1151c and the third Hall sensor 1153bc may be sensed. Therefore, the first camera actuator according to the embodiment may control X-axis tilting Therefore, the first camera actuator according to the embodiment may control Y-axis tilting. One or more first to third Hall sensors may be provided.

The first board unit 1154 may be positioned on a lower portion of the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 through a surface mounting technology (SMT). However, the present invention is not limited to this method.

The first board unit 1154 may be positioned between the first shield can (not shown) and the first housing 1120 and coupled to the first shield can and the first housing 1120. The coupling method may be variously performed as described above. In addition, through the coupling, the first driving coil 1152 and the first Hall sensor unit 1153 may be positioned within an outer side surface of the first housing 1120.

The first board unit 1154 includes a circuit board having line patterns that may be electrically connected, such as a rigid printed circuit board (RPCB), a flexible PCB (FPCB), and a rigid flexible PCB (RFPCB). However, the present invention is not limited to these types.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, a first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, a second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap in the second direction (Y-axis direction), and the first magnet 1151a and the second magnet 1151b may overlap in the second direction (Y-axis direction). With this configuration, an electromagnetic force applied to the outer side surfaces of the holders (the first holder outer side surface and the second holder outer side surface) may be positioned on a parallel axis in the second direction (Y-axis direction), thereby accurately and precisely performing X-axis tilting.

In addition, a first accommodating groove (not shown) may be positioned in a fourth holder outer side surface. In addition, first protrusions PR1a and PR1b may be disposed in the first accommodating groove. Therefore, when X-axis tilting is performed, the first protrusions PR1a and PR1b may be reference axes (or rotational axes) of the tilt. Therefore, the rotational plate 1141 and the mover 1130 may move in a left-right direction.

As described above, the second protrusion PR2 may be seated in the groove of an inner side surface of the fourth housing side portion 1124. In addition, when Y-axis tilting is performed, the rotational plate and the mover may be rotated about the second protrusion PR2 that is a reference axis of the Y-axis tilt.

According to the embodiment, an OIS function may be performed by the first protrusion and the second protrusion.

Referring to FIG. 6, Y-axis tilting may be performed. In other words, an OIS can be implemented by the rotation in the first direction (X-axis direction).

In an embodiment, the third magnet 1151c disposed under the holder 1131 may form an electromagnetic force with the third coil 1152c to tilt or rotate the mover 1130 in the first direction (X-axis direction).

Specifically, the rotational plate 1141 may be coupled to the first housing 1120 and the mover 1130 by the first magnetic part 1142 in the first housing 1120 and the second magnetic part 1143 in the mover 1130. In addition, the first protrusions PR1 may be spaced apart from each other in the first direction (X-axis direction) and supported by the first housing 1120.

In addition, the rotational plate 1141 may rotate or tilt based on the second protrusion PR2 protruding toward the mover 1130, which is the reference axis (or the rotational axis). In other words, the rotational plate 1141 may perform Y-axis tilting based on the second protrusion PR2 that is the reference axis.

For example, an OIS can be implemented by rotating (X1→X1a or X1b) the mover 130 at a first angle θ1 in the X-axis direction by first electromagnetic forces F1A and F1B between the third magnet 1151c disposed in the third seating groove and the third coil 1152c disposed on the third board side portion. The first angle θ1 may be in the range of ±1° to 3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force refers to a direction of the force generated by the magnet and the coil to move the mover.

Referring to FIG. 7, X-axis tilting may be performed. In other words, an OIS can be implemented by the rotation in the second direction (Y-axis direction).

The OIS can be implemented by tilting or rotating (or X-axis tilting) the mover 1130 in the Y-axis direction.

In an embodiment, the first magnet 1151a and the second magnet 1151b disposed on the holder 1131 generate electromagnetic forces with the first coil 1152a and the second coil 1152b, respectively, to tilt or move the rotational plate 1141 and the mover 1130 in the second direction (Y-axis direction).

The rotational plate 1141 may rotate or tilt (may perform X-axis tilting) based on the first protrusion PR1 that is a reference axis (or a rotational axis) in the second direction.

For example, the OIS can be implemented by rotating (Y1→Y1a, Y1b) the mover 1130 at a second angle θ2 in the Y-axis direction by second electromagnetic forces F2A and F2B between the first and second magnets 1151a and 1151b disposed in the first seating groove and the first and second coils 1152a and 1152b disposed on the first and second board side portions. The second angle θ2 may be in the range of ±1° to 3°. However, the present invention is not limited thereto.

In addition, as described above, the electromagnetic force generated by the first and second magnets 1151a and 1151b and the first and second coils 1152a and 1152b may act in the third direction or in a direction opposite to the third direction. For example, the electromagnetic force may be generated from a left portion of the mover 1130 in the third direction (Z-axis direction) and may act from a right portion of the mover 1130 in the direction opposite to the third direction (Z-axis direction). Therefore, the mover 1130 may rotate with respect to the first direction. Alternatively, the mover 1130 may move along the second direction.

As described above, the first actuator according to the embodiment may control the rotational plate 1141 and the mover 1130 to be rotated in the first direction (X-axis direction) or the second direction (Y-axis direction) by the electromagnetic force between the first driving magnet in the holder and the first driving coil disposed in the housing, thereby minimizing the occurrence of a decentering or tilting phenomenon when implementing an OIS and providing the best optical characteristics. In addition, as described above, "Y-axis tilting" corresponds to the rotation or tilting in the first direction (X-axis direction), and "X-axis tilting" corresponds to the rotation or tilting in the second direction (Y-axis direction).

FIG. 8 is a perspective view of a second camera actuator according to the embodiment, FIG. 9 is an exploded perspective view of the second camera actuator according to the embodiment, FIG. 10 is a cross-sectional view along line D-D' in FIG. 8, FIGS. 11 and 12 are views for describing the driving of each lens assembly according to an embodiment, and FIG. 13 is a view showing the driving of the second camera actuator according to an embodiment.

Referring to FIGS. 8 to 10, the second camera actuator 1200 according to the embodiment may include a lens unit 1220, a second housing 1230, a second driving unit 1250, a base unit 1260, a second board unit 1270, and a bonding member 1280. Furthermore, the second camera actuator 1200 may further include a second shield can (not shown), an elastic unit (not shown), and a bonding member (not shown).

The second shield can (not shown) may be positioned in one region (e.g., an outermost side) of the second camera actuator 1200 and positioned to surround the following components (the lens unit 1220, the second housing 1230, the second driving unit 1250, the base unit 1260, the second board unit 1270, and an image sensor IS).

The second shield can (not shown) may block or reduce the influence of electromagnetic waves generated from the outside. Therefore, it is possible to reduce the number of occurrences of malfunction of the second driving unit 1250.

The lens unit 1220 may be positioned in the second shield can (not shown). The lens unit 1220 may move in the third direction (Z-axis direction or optical axis direction). Therefore, the AF function or zooming function described above may be performed.

In addition, the lens unit 1220 may be positioned in the second housing 1230. Therefore, at least a portion of the lens unit 1220 may move in the optical axis direction or the third direction (Z-axis direction) in the second housing 1230.

Specifically, the lens unit 1220 may include a lens group 1221 and a moving assembly 1222.

First, the lens group 1221 may include one or more lenses. In addition, a plurality of lens groups 1221 may be provided, hereinafter, but a description will be given based on one lens group.

The lens group 1221 may be coupled to the moving assembly 1222 and may move in the third direction (Z-axis direction) by the electromagnetic forces generated from a fourth magnet 1252a and a fifth magnet 1252b coupled to the moving assembly 1222.

In an embodiment, the lens group 1221 may include a first lens group 1221a, a second lens group 1221b, and a third lens group 1221c. The first lens group 1221a, the second lens group 1221b, and the third lens group 1221c may be sequentially disposed in the optical axis direction.

The first lens group 1221a may be coupled to and fixed to a 2-1 housing. In other words, the first lens group 1221a may not move in the optical axis direction.

The second lens group 1221b may be coupled to the first lens assembly 1222a and may move in the third direction or the optical axis direction. Magnification may be adjusted by moving the first lens assembly 1222a and the second lens group 1221b.

The third lens group 1221c may be coupled to the second lens assembly 1222b and may move in the third direction or the optical axis direction. Focal adjustment or AF function may be performed by moving the third lens group 1221c.

However, the present invention is not limited to the number of lens groups, and a fourth lens group or the like may be further disposed on a rear end of the third lens group 1221c.

The moving assembly 1222 may include an opening region surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof, and may be coupled to the fourth magnet 1252a and the fifth magnet 1252b through the groove. A coupling member or the like may be applied to the groove.

In addition, the moving assembly 1222 may be coupled to the elastic units (not shown) on an upper end and a lower end thereof. Therefore, the moving assembly 1222 may be supported by the elastic unit (not shown) while moving in the third direction (Z-axis direction). In other words, the moving assembly 1222 may be maintained in the third direction (Z-axis direction) as the position of the moving assembly 1222 is maintained. The elastic unit (not shown) may be formed as a leaf spring.

The moving assembly 1222 may be positioned in the second housing 1230 and may include the first lens assembly 1222a and the second lens assembly 1222b.

A region where the third lens group is seated in the second lens assembly 1222b may be positioned on a rear end of the first lens assembly 1222a. In other words, the region where the third lens group 1221c is seated in the second lens assembly 1222b may be positioned between a region where the second lens group 1221b is seated in the first lens assembly 1222a and the image sensor.

The first lens assembly 1222a and the second lens assembly 1222b may include a first guide unit G1 and a second guide unit G2, respectively.

The first guide unit G1 of the first lens assembly 1222a and the second guide unit G2 of the second lens assembly 1222b may be positioned to correspond to each other. For example, the first guide unit G1 and the second guide unit G2 may be positioned opposite to each other in the third direction. In addition, the first guide unit G1 and the second guide unit G2 may at least partially overlap each other in the second direction (Y-axis direction).

The first guide unit G1 and the second guide unit G2 may include at least one groove or recess. In addition, a first ball B1 or a second ball B2 may be seated in the groove or the recess. Therefore, the first ball B1 or the second ball B2 may move in the third direction along a rail formed inside a first side portion 1232a of the second housing 1230 or a rail formed inside a second side portion 1232b of the second housing 1230. Therefore, the first lens assembly 1222a and the second lens assembly 1222b may move in the third direction.

In addition, the second driving magnet may be seated on outer side surfaces of the first lens assembly 1222a and the second lens assembly 1222b. For example, the fifth magnet 1252b may be seated on the outer side surface of the second lens assembly 1222b. The fourth magnet 1252a may be seated on the outer side surface of the first lens assembly 1222a.

The second housing 1230 may be disposed between the lens unit 1220 and the second shield can (not shown). In addition, the second housing 1230 may be disposed to surround the lens unit 1220.

The second housing 1230 may include a 2-1 housing 1231 and a 2-2 housing 1232. The 2-1 housing 1231 may be coupled to the first lens group 1221a and may also be coupled to the above-described first camera actuator. The 2-1 housing 1231 may be positioned in front of the 2-2 housing 1232.

In addition, the 2-2 housing 1232 may be positioned on a rear end of the 2-1 housing 1231. The lens unit 1220 may be seated inside the 2-2 housing 1232.

A hole may be formed in a side portion of the second housing 1230 (or the 2-2 housing 1232). The fourth coil 1251a and the fifth coil 1251b may be disposed in the hole. The hole may be positioned to correspond to the groove of the moving assembly 1222.

In an embodiment, the second housing 1230 may include the first side portion 1232a and the second side portion 1232b. The first side portion 1232a and the second side portion 1232b may be positioned to correspond to each other. For example, the first side portion 1232a and the second side portion 1232b may be disposed symmetrically with respect to the third direction. The second driving coil 1251 may be positioned on the first side portion 1232a and the second side portion 1232b. In addition, the second board unit 1270 may be seated on outer side surfaces of the first side portion 1232a and the second side portion 1232b. In other words, a first board 1271 may be positioned on the outer side surface of the first side portion 1232a, and a second board 1272 may be positioned on the outer side surface of the second side portion 1232b.

The fifth magnet 1252b may be positioned to face the fifth coil 1251b. In addition, the fourth magnet 1252a may be positioned to face the fourth coil 1251a.

The elastic unit (not shown) may include a first elastic member (not shown) and a second elastic member (not shown). The first elastic member (not shown) may be coupled to an upper surface of the moving assembly 1222. The second elastic member (not shown) may be coupled to a lower surface of the moving assembly 1222. In addition, the first elastic member (not shown) and the second elastic member (not shown) may be formed as leaf springs as described above. In addition, the first elastic member (not shown) and the second elastic member (not shown) may provide elasticity for the movement of the moving assembly 1222.

The second driving unit 1250 may provide a driving force for moving the lens unit 1220 in the third direction (Z-axis direction). The second driving unit 1250 may include the second driving coil 1251 and a second driving magnet 1252. Furthermore, the second driving unit 1250 may include a second Hall sensor unit. The second Hall sensor unit 1253 may include at least one fourth Hall sensor 1253a and may be positioned inside or outside the second driving coil 1251.

The moving assembly may move in the third direction (Z-axis direction) by the electromagnetic force formed between the second driving coil 1251 and the second driving magnet 1252.

The second driving coil 1251 may include the fourth coil 1251a and the fifth coil 1251b. In addition, the fourth coil 1251a and the fifth coil 1251b may be disposed in the hole formed in the side portion of the second housing 1230. In addition, the fourth coil 1251a and the fifth coil 1251b may be electrically connected to the second board unit 1270.

Therefore, the fourth coil 1251a and the fifth coil 1251b may receive a current or the like through the second board unit 1270.

The second driving magnet 1252 may include the fourth magnet 1252a and the fifth magnet 1252b. The fourth magnet 1252a and the fifth magnet 1252b may be disposed in the above-described groove of the moving assembly 1222 and positioned to correspond to the fourth coil 1251a and the fifth coil 1251b.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, the image sensor can be free from foreign substances and the like, thereby improving the reliability of the device. However, hereinafter, a description will be given after removing the image sensor in some drawings.

In addition, the second camera actuator 1200 may be a zoom actuator or an AF actuator. For example, the second camera actuator may support one or more lenses and perform an AF function or a zooming function by moving the lens according to a control signal of a predetermined control unit.

In addition, the second camera actuator may be a fixed zoom actuator or a continuous zoom actuator. For example, the second camera actuator may provide the movement of the lens group 1221.

In addition, the second camera actuator may be composed of a plurality of lens assemblies. For example, one or more of a third lens assembly (not shown) other than the first lens assembly 1222a and the second lens assembly 1222b and a guide pin (not shown) may be disposed in the second camera actuator. The above description may be applied to a description thereof. Therefore, the second camera actuator may perform a high-magnification zooming function through the second driving unit. For example, the first lens assembly 1222a and the second lens assembly 1222b may be moving lenses moving through the second driving unit and the guide pin (not shown), and the third lens assembly (not shown) may be a fixed lens but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222b which is the variator. However, the configuration of the embodiment will be described with reference to the following drawings.

The image sensor may be positioned inside or outside the second camera actuator. In an embodiment, as shown, the image sensor may be positioned outside the second camera actuator. For example, the image sensor may be positioned on a circuit board. The image sensor may receive light and convert the received light into an electrical signal. In addition, the image sensor may have a plurality of pixels in an array form. In addition, the image sensor may be positioned on the optical axis.

The second board unit 1270 may be in contact with the second housing side portion. For example, the second board unit 1270 may be positioned on the second housing, in particular, the outer side surface (first side surface) of the first side portion of the 2-2 housing and the outer side surface (second side surface) of the second side portion of the 2-2 housing and may be in contact with the first side surface and the second side surface.

The bonding member 1280 may be disposed between the first lens assembly 1222a and the second lens assembly 1222b. In an embodiment, the bonding member 1280 may be disposed in contact with at least one of the first lens assembly 1222a and the second lens assembly 1222b between the first lens assembly 1222a and the second lens assembly 1222b. For example, the bonding member 1280 may be formed as at least one of a first bonding member 1280a in contact with the first lens assembly 1222a and a second bonding member 1280b in contact with the second lens assembly 1222b. In the embodiment, the following description will be given on the basis of the bonding member 1280 composed of the first bonding member 1280a and the second bonding member 1280b. In addition, in another embodiment or still another embodiment below, a case in which the bonding member 1280 is any one of the first bonding member 1280a and the second bonding member 1280b will be described.

The bonding member 1280 may be made of a material having a bonding function. For example, the bonding member 1280 may be made of an epoxy or silicone material. In addition, the bonding member 1280 may lose the bonding function at a predetermined temperature after cured. Therefore, the bonding member before separation may lose a bonding force at the predetermined temperature after the first lens assembly 1222a and the second lens assembly 1222b are coupled and lens adjustment or alignment is performed and thus may be separated into the first lens assembly 1222a or the second lens assembly 1222b. In other words, when the predetermined temperature is provided before separation, the bonding member may be separated into any one of the first bonding member 1280a and the second bonding member 1280b. A detailed description thereof will be given below.

Referring to FIGS. 11 and 12, in the camera device according to the embodiment, by generating an electromagnetic force DEM1 between the fourth magnet 1252a and the fourth coil 1251a, the first lens assembly 1222a may move along a rail positioned on the inner side surface of the housing through the first ball B1 in a direction parallel to the optical axis, that is, in the third direction (Z-axis direction) or the direction opposite to the third direction.

Specifically, in the camera device according to the embodiment, the fourth magnet 1252a may be provided in the first lens assembly 1222a, for example, by a vertical unipolar magnetization method. For example, in the embodiment, both of the N pole and the S pole of the fourth magnet 1252a may be positioned to face the fourth coil 1251a. Therefore, each of the N pole and the S pole of the fourth magnet 1252a may be disposed to correspond to a region in which a current flows from the fourth coil 1251a in the X-axis direction or a direction opposite to the X-axis direction.

In an embodiment, when a magnetic force is applied from the N pole of the fourth magnet 1252a in a direction opposite to the second direction (Y-axis direction) and a current DE1 flows at the fourth coil 1251a corresponding to the N pole in a direction opposite to the first direction (X-axis direction), an electromagnetic force DEM1 may act in the third direction (Z-axis direction) according to the interaction of the electromagnetic force (e.g., Fleming's left hand rule).

In addition, in the embodiment, when a magnetic force is applied from the S pole of the fourth magnet 1252a in the second direction (Y-axis direction) and the current DE1 flows at the fourth coil 1251a corresponding to the S pole in the first direction (X-axis direction), the electromagnetic force DEM1 may act in the Z-axis direction according to the interaction of the electromagnetic force.

At this time, since the fourth coil 1251a is in a state of being fixed to the housing side portion, the first lens assembly 1222a on which the fourth magnet 1252a is disposed may move in the direction opposite to the Z-axis direction by the electromagnetic force DEM1 according to the current direction. In addition, the direction of the electromagnetic force may be changed depending on the current of the coil and the magnetic force of the magnet. Therefore, the first lens assembly 1222a may move along the rail positioned on the inner side surface of the housing through the first ball B1 in the third direction or the direction (both directions) parallel to the optical axis direction. At this time, the electromagnetic force DEM1 may be controlled in proportion to the current DE1 applied to the fourth coil 1251a.

In the camera device according to the embodiment, the fifth magnet 1252b may be provided in the second lens assembly 1222b, for example, by a vertical unipolar magnetization method. For example, in the embodiment, both of the N pole and the S pole of the fifth magnet 1252b may be positioned to face the fifth coil 1251b. Therefore, each of the N pole and the S pole of the fifth magnet 1252b may be disposed to correspond to a region in which a current flows from the fifth coil 1251b in the X-axis direction or a direction opposite to the X-axis direction.

In the embodiment, when a magnetic force DM2 is applied from the N pole of the fifth magnet 1252b in the second direction (Y-axis direction) and the current DE2 flows at the fifth coil 1251b corresponding the N pole in the first direction (X-axis direction), an electromagnetic force DEM2 may act in the third direction (Z-axis direction) according to the interaction of the electromagnetic force (e.g., Fleming's left hand rule).

In addition, in the embodiment, when a magnetic force is applied from the S pole of the fifth magnet 1252b in the direction opposite to the second direction (Y-axis direction) and the current DE2 flows at the fifth coil 1251b corresponding the S pole in the direction opposite to the first direction (X-axis direction), the electromagnetic force DEM2 may act in the Z-axis direction according to the interaction of the electromagnetic force.

At this time, since the fifth coil 1251b is a state of being fixed to the housing side portion, the second lens assembly 1222b on which the fifth magnet 1252b is disposed may move in the direction opposite to the Z-axis direction by the electromagnetic force DEM2 according to the current direction. For example, as described above, the direction of the electromagnetic force may be changed depending on the current of the coil and the magnetic force of the magnet. Therefore, the second lens assembly 1222b may move along the rail positioned on the inner side surface of the second housing through the second ball B2 in the direction parallel to the third direction (Z-axis direction). At this time, the electromagnetic force DEM2 may be controlled in proportion to the current DE2 applied to the fifth coil 1251b.

Referring to FIG. 13, in the camera device according to the embodiment, the second driving unit may provide driving forces F3A, F3B, F4A, and F4B for moving the first lens assembly 1222a and the second lens assembly 1222b of the lens unit 1220 in the third direction (Z-axis direction). As described above, the second driving unit may include the second driving coil 1251 and the second driving magnet 1252. In addition, the lens unit 1220 may move in the third direction (Z-axis direction) by the electromagnetic force formed between the second driving coil 1251 and the second driving magnet 1252.

At this time, the fourth coil 1251a and the fifth coil 1251b may be disposed in the holes formed in the side portions (e.g., the first side portion and the second side portion) of the second housing 1230. In addition, the fifth coil 1251b may be electrically connected to the first board 1271. The fourth coil 1251a may be electrically connected to the second board 1272. Therefore, the fourth coil 1251a and the fifth coil 1251b may receive a driving signal (e.g., a current) from a driving driver on the circuit board of the circuit board 1300 through the second board unit 1270.

At this time, the first lens assembly 1222a on which the fourth magnet 1252a is seated may move in the third direction (Z-axis direction) by the electromagnetic forces F3A and F3B between the fourth coil 1251a and the fourth magnet 1252a. In addition, the second lens group 1221b seated on the first lens assembly 1222a may also move in the third direction.

In addition, the second lens assembly 1222b on which the fifth magnet 1252b is seated may move in the third direction (Z-axis direction) by the electromagnetic forces F4A and F4B between the fifth coil 1251b and the fifth magnet 1252b. In addition, the third lens group 1221c seated on the second lens assembly 1222b may also move in the third direction.

Therefore, as described above, the focal length or magnification of the optical system may be changed by moving the second lens group 1221b and the third lens group 1221c. In an embodiment, the magnification may be changed by moving the second lens group 1221b. In other words, zooming may be performed. In addition, the focus may be adjusted by moving the third lens group 1221c. In other words, an AF function may be performed. With this configuration, the second camera actuator may be a fixed zoom actuator or a continuous zoom actuator.

FIG. 14 is a schematic diagram showing a circuit board according to an embodiment.

Referring to FIG. 14, as described above, the circuit board 1300 according to the embodiment may include a first circuit board unit 1310 and a second circuit board unit 1320. The first circuit board unit 1310 may be positioned under and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first sidewall of the base. Therefore, the second circuit board unit 1320 may be positioned adjacent to the fourth coil positioned adjacent to the first sidewall so that electrical connection may be easily made.

Furthermore, the circuit board 1300 may further include a fixed board (not shown) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on a side portion of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having line patterns that may be electrically connected, such as an RPCB, an FPCB, and an RFPCB. However, the present invention is not limited to these types.

In addition, the circuit board 1300 may be electrically connected to another camera module in the terminal or a processor of the terminal. Therefore, the camera actuator and the camera device including the camera actuator described above may transmit and receive various signals within the terminal.

FIG. 15 is a perspective view of a first lens assembly, a first bonding member, a second bonding member, and a second lens assembly according to an embodiment, FIG. 16 is a view showing the alignment performed by coupling the first lens assembly and the second lens assembly by the bonding member before separation, and FIG. 17 is a perspective view of the first lens assembly, the first bonding member, the second bonding member, and the second lens assembly according to the embodiment after the bonding member in FIG. 16 is separated.

Referring to FIG. 16, the first lens assembly 1222a and the second lens assembly 1222b may be disposed to be spaced apart from each other in the optical axis direction (Z-axis direction). In addition, the first lens assembly 1222a and the second lens assembly 1222b may move in the optical axis direction (Z-axis direction) by the second driving unit. For example, an auto focus or zooming function may be performed by moving the first lens assembly 1222a and the second lens assembly 1222b.

In addition, the first lens assembly 1222a may include a first lens holder LAH1 for holding and coupling the first guide unit G1 and the second lens group 1221b. The first lens holder LAH1 may be coupled to the first guide unit G1. In addition, the first lens holder LAH1 may include a first lens hole LH1 for accommodating the second lens group 1221b. In other words, at least one lens may be disposed in the first lens hole LH1. The first guide unit G1 may be disposed on one side of the first lens holder LAH1. For example, the first guide unit G1 and the first lens holder LAH1 may be sequentially disposed in the second direction (Y-axis direction).

In addition, the second lens assembly 1222b may include a second lens holder LAH2 for holding and coupling the second guide unit G2 and the third lens group 1221c. The second lens holder LAH2 may be coupled to the second guide unit G2. In addition, the second lens holder LAH2 may include a second lens hole LH2 for accommodating the third lens group 1221c. In other words, at least one lens may be disposed in the second lens hole LH2.

The second guide unit G2 may be disposed on the other side of the second lens holder LAH2. The second guide unit G2 may be disposed opposite to the first guide unit G1. In an embodiment, the first guide unit G1 and the second guide unit G2 may at least partially overlap each other in the second direction (Y-axis direction). With this configuration, it is possible to improve the space efficiency of the second driving unit for moving the first and second lens assemblies in the second camera actuator, thereby easily miniaturizing the second camera actuator.

In addition, the second guide unit G2 and the second lens holder LAH2 may be sequentially disposed in a direction opposite to the second direction (Y-axis direction).

The first ball, the fourth magnet, and the like may be disposed in the first guide unit G1 as described above, and the second ball, the fifth magnet, and the like may be disposed in the second guide unit G2 as described above.

The above-described separated bonding member, that is, the first bonding member 1280a and the second bonding member 1280b may be disposed between the first lens assembly 1222a and the second lens assembly 1222b. The first bonding member 1280a may be in contact with the first lens assembly 1222a, and the second bonding member 1280b may be in contact with the second lens assembly 1222b.

In an embodiment, the first lens assembly 1222a and the second lens assembly 1222b may include outer side surfaces adjacent to each other. The first lens assembly 1222a may include a first outer side surface M1, and the second lens assembly 1222b may include a second outer side surface M2. The first outer side surface M1 may be a lower surface of the first lens holder LAH1 with respect to the optical axis direction (Z-axis direction). In addition, a third outer side surface M3 to be described below may be an upper surface of the first lens holder LAH1. In addition, the second outer side surface M2 may be an upper surface of the second lens holder LAH2, and a fourth outer side surface M4 may be a lower surface of the second lens holder LAH2.

The second outer side surface M2 and the third outer side surface M3 may be disposed to face each other. Even when the first bonding member 1280a or the second bonding member 1280b is disposed between the second outer side surface M2 and the third outer side surface M3, the second outer side surface M2 and the third outer side surface M3 may be disposed to at least partially face each other. Alternatively, the second outer side surface M2 and the third outer side surface M3 may be adjacent outer side surfaces between the first lens assembly 1222a and the second lens assembly 1222b. Alternatively, the second outer side surface M2 and the third outer side surface M3 may be adjacent outer side surfaces between the first lens holder LAH1 and the second lens holder LAH2.

In addition, the first outer side surface M1 and the second outer side surface M2 may at least partially overlap each other in the optical axis direction (Z-axis direction). In an embodiment, the first outer side surface M1 to the fourth outer side surface M4 may at least partially overlap each other in the optical axis direction (Z-axis direction).

The bonding member 1280 may be in contact with at least one of the first outer side surface M1 and the second outer side surface M2. The first bonding member 1280a may be in contact with the first outer side surface M1. In an embodiment, the first bonding member 1280a may overlap the first outer side surface M1 in the optical axis direction (Z-axis direction). In addition, the second bonding member 1280b may be in contact with the second outer side surface M2. In an embodiment, the second bonding member 1280b may overlap the second outer side surface M2 in the optical axis direction (Z-axis direction).

In addition, in an embodiment, the first bonding member 1280a and the second bonding member 1280b may not overlap at least partially in the optical axis direction (Z-axis direction). For example, the outer side surface of the first bonding member 1280a on the first outer side surface M1 and the outer side surface of the second bonding member 1280b on the second outer side surface M2 may correspond to each other. With this configuration, even when the first lens assembly 1222a and the second lens assembly 1222b come into contact with each other while moving in the optical axis direction (Z-axis direction), an impact can be reduced by the first bonding member 1280a and the second bonding member 1280b. Furthermore, the shapes of the first bonding member 1280a and the second bonding member 1280b correspond to each other, and thus the impact may spread uniformly to the first bonding member 1280a and the second bonding member 1280b without being concentrated on a partial region. Therefore, it is possible to improve the reliability of the second camera actuator.

In addition, the first bonding member 1280a and the second bonding member 1280b may partially overlap each other in the optical axis direction (Z-axis direction). In this case, a length of the bonding member before separation in the optical axis direction (Z-axis direction) may be the sum of lengths of the separated first bonding member 1280a and second bonding member 1280b in the optical axis direction (Z-axis direction).

In an embodiment, the first bonding member 1280a may be disposed in a partial region on the first outer side surface M1, and the second bonding member 1280b may be disposed in a partial region on the second outer side surface M2. An area (XY plane) of the first bonding member 1280a may be smaller than an area (XY plane) of the first outer side surface M1. In addition, an area (XY plane) of the second bonding member 1280b may be smaller than an area (XY plane) of the second outer side surface M2.

Referring to FIGS. 16 and 17, a bonding member 1280' before separation may be disposed between the first lens assembly 1222a and the second lens assembly 1222b so that the first lens assembly 1222a and the second lens assembly 1222b may be coupled. In other words, the bonding member 1280' before separation can improve a coupling force between the first lens assembly 1222a and the second lens assembly 1222b. Therefore, it is possible to minimize an optical or mechanical alignment error between the second lens group 1221b in the first lens assembly 1222a and the third lens group 1221c in the second lens assembly 1222b. For example, upon inspecting the optical alignment of the second lens group 1221b and the third lens group 1221c, the second lens group 1221b and the third lens group 1221c, which are coupled between a master first lens group (for inspection) corresponding to the first lens group and a master image sensor (for inspection) corresponding to the image sensor, are disposed so that the optical inspection may be easily performed. Therefore, the optical inspection may not be performed on each of the second lens group 1221b and the third lens group 1221c. In other words, it is possible to facilitate an inspection process. Furthermore, according to an embodiment, it is possible to minimize an error occurring upon assembling between the second lens group 1221b and the third lens group 1221c and suppress the degradation of optical performance that occurs according to the driving (moving in the Z-axis direction) of the separated second lens group 1221b and third lens group 1221c.

In an embodiment, the bonding member 1280' may be made of a material having a bonding function as described above. In addition, the bonding member 1280 may lose the bonding function at a predetermined temperature after cured (the first lens assembly and the second lens assembly are coupled). Therefore, the bonding member 1280' before separation may lose a bonding force at the predetermined temperature after the first lens assembly 1222a and the second lens assembly 1222b are coupled and lens adjustment or alignment is performed and may be separated into the first lens assembly 1222a or the second lens assembly 1222b.

The first bonding member 1280a and the second bonding member 1280b separated at the predetermined temperature may be respectively present on the first outer side surface and the second outer side surface to perform an operation of absorbing an impact caused by the movement of the first lens assembly 1222a and the second lens assembly 1222b.

In an embodiment, the first lens assembly 1222a may move within a first moving distance in the optical axis direction (Z-axis direction), and the second lens assembly 1222b may move within a second moving distance in the optical axis direction (Z-axis direction). At this time, the first moving distance and the second moving distance may be different. For example, the first lens assembly performs the zooming function, the second lens assembly performs the AF function, and the first moving distance may be smaller than the second moving distance.

In addition, a first length L1 of the first bonding member 1280a in the optical axis direction (Z-axis direction) may be smaller than a second length L2 of the second bonding member 1280b in the optical axis direction (Z-axis direction). With this configuration, the impact on the second lens assembly having a large moving distance can be easily reduced by the second bonding member 1280b. Therefore, it is possible to improve the reliability of the second camera actuator.

FIG. 18 is a view showing a first outer side surface of the first lens assembly according to the embodiment, and FIG. 19 is a view showing a second outer side surface of the second lens assembly according to the embodiment.

Referring to FIGS. 18 and 19, the first lens assembly 1222a according to the embodiment may include the first lens holder LAH1 and the first guide unit G1.

In addition, the first outer side surface M1, which is the lower surface of the first lens holder LAH1, may include a 1-1 outer region M1a symmetrical in the first direction (X-axis direction) and having a curved outer edge CE1 and a 1-2 outer region M1b symmetrical in the second direction (Y-axis direction) and having a flat outer edge PE1. For example, a plurality of (e.g., two) 1-1 outer regions M1a may be provided, spaced apart from each other in the second direction (Y-axis direction), and positioned adjacent to the first guide unit G1 and the second guide unit G2.

In addition, a plurality of (e.g., two) 1-2 outer regions M1b may be provided in contact with the 1-1 outer region M1a and disposed to be spaced apart from each other in the first direction (X-axis direction).

The outer edge CE1 of the 1-1 outer region M1a may have a greater curvature than the outer edge PE1 of the 1-2 outer region M1b. For example, the outer edge PE1 of the 1-2 outer region M1b may be parallel to the second direction (Y-axis direction). In addition, as described above, the first direction may correspond to the X-axis direction and may be a direction perpendicular to the optical axis direction (Z-axis direction) in the drawings, and the second direction may correspond to the Y-axis direction, may be perpendicular to the first direction and the optical axis direction, and may be the same as a direction from the first guide unit toward the second guide unit in the drawings.

In addition, in an embodiment, a first minimum thickness D1 of the 1-1 outer region M1a may be greater than a second minimum thickness D2 of the 1-2 outer region M1b. Therefore, it is possible to minimize the length of the second camera actuator or the camera module (or the device) including the second camera actuator in the first direction (X-axis direction). Therefore, it is possible to reduce the thickness of the camera actuator or the module and also reduce the thickness of the mobile terminal. In other words, it is possible to easily achieve the slimness of the mobile terminal.

In addition, a center of the first lens hole LH1 of the first lens holder LAH1 may overlap an optical axis OX. Likewise, a center of the second lens hole LH2 of the second lens holder LAH2 to be described below may also overlap the optical axis OX.

In an embodiment, the first bonding member 1280a may be disposed in the 1-1 outer region M1a and the 1-2 outer region M1b. As a modified embodiment, when the second minimum thickness D2 of the 1-2 outer region M1b is smaller than a predetermined length, the first bonding member 1280a may be disposed only in the 1-1 outer region M1a. Therefore, it is possible to prevent the first bonding member 1280a from overflowing into the second lens group. Therefore, it is possible to block the degradation of the optical performance.

Corresponding to the first minimum thickness D1 and the second minimum thickness D2, a thickness D1' of the first bonding member 1280a in the 1-1 outer region M1a may be greater than a thickness D2' of the first bonding member 1280a in the 1-2 outer region M1b. With this configuration, it is possible to prevent the bonding member from moving to the second lens group while improving the bonding force by the bonding member.

For example, the first bonding member 1280a may be disposed to be spaced a predetermined distance from the outer edge CE1 or an inner edge of the 1-1 outer region M1a. In addition, the first bonding member 1280a may be disposed to be spaced a predetermined distance from the outer edge PE1 or an inner edge on the 1-2 outer region M1b.

In addition, the second outer side surface M2, which is the upper surface of the second lens holder LAH2, may include a 2-1 outer region M2a symmetrical in the first direction (X-axis direction) and having a curved outer edge CE2 and a 2-2 outer region M2b symmetrical in the second direction (Y-axis direction) and having a flat outer edge PE2. For example, a plurality of (e.g., two) 2-1 outer regions M2a may be present, spaced apart from each other in the second direction (Y-axis direction), and positioned adjacent to the first guide unit G1 and the second guide unit G2.

In addition, a plurality of (e.g., two) 2-2 outer regions M2b may be present, may be in contact with the 2-1 outer region M2a, and may be disposed to be spaced apart from each other in the first direction (X-axis direction).

The outer edge CE2 of the 2-1 outer region M2a may have a greater curvature than the outer edge PE2 of the 2-2 outer region M2b. For example, the outer edge PE2 of the 2-2 outer region M2b may be parallel to the second direction (Y-axis direction).

In addition, in an embodiment, a third minimum thickness D3 of the 2-1 outer region M2a may be greater than a fourth minimum thickness D4 of the 2-2 outer region M2b. Therefore, it is possible to minimize the length of the second camera actuator or the camera module (or the device) including the second camera actuator in the first direction (X-axis direction). Therefore, it is possible to reduce the thickness of the camera actuator or the module and also reduce the thickness of the mobile terminal. In other words, it is possible to easily achieve the slimness of the mobile terminal.

In addition, in an embodiment, the second bonding member 1280b may be disposed on the 2-1 outer region M2a and the 2-2 outer region M2b. As a modified embodiment, when the fourth minimum thickness D4 of the 2-2 outer region M2b is smaller than a predetermined length, the second bonding member 1280b may be disposed only in the 2-1 outer region M2a. Therefore, it is possible to prevent the second bonding member 1280b from overflowing into the third lens group. Therefore, it is possible to block the degradation of the optical performance.

Corresponding to the third minimum thickness D3 and the fourth minimum thickness D4, a thickness D3' of the second bonding member 1280b in the 2-1 outer region M2a may be greater than a thickness D4' of the second bonding member 1280b in the 2-2 outer region M2b. With this configuration, it is possible to prevent the bonding member from moving to the third lens group while improving the bonding force by the bonding member.

For example, the second bonding member 1280b may be disposed to be spaced a predetermined distance from the outer edge CE2 or an inner edge on the 2-1 outer region M2a. In addition, the second bonding member 1280b may be disposed to be spaced a predetermined distance from the outer edge PE2 or an inner edge on the 2-2 outer region M2b.

In addition, the second minimum thickness D2 may be smaller than the fourth minimum thickness D4. Therefore, it is possible to easily improve the reliability of the second lens assembly having a large moving distance.

FIG. 20 is a view showing a third outer side surface of the first lens assembly according to the embodiment, and FIG. 21 is a view showing a fourth outer side surface of the second lens assembly according to the embodiment.

Referring to FIGS. 20 and 21, the first lens assembly 1222a may further include the third outer side surface M3 that is the upper surface of the first lens holder LAH1.

In addition, the third outer side surface M3 may include a 3-1 outer region M3a and a 3-2 outer region M3b, which are symmetrical in the first direction and have curved outer corners. For example, a plurality of (e.g., two) 3-1 outer regions M3a may be present, spaced apart from each other in the second direction (Y-axis direction), and positioned adjacent to the first guide unit G1 and the second guide unit G2. In addition, a plurality of (e.g., two) 3-2 outer regions M3b may be present, may be in contact with the 3-1 outer region M3a, and may be disposed to be spaced apart from each other in the first direction (X-axis direction).

An outer edge of the 3-1 outer region M3a may have a greater curvature than an outer edge of the 3-2 outer region M3b. For example, the outer edge of the 3-2 outer region M3b may be parallel to the second direction (Y-axis direction).

A fifth minimum thickness D5 of the 3-1 outer region M3a may be greater than a minimum thickness of the 3-2 outer region M3b. In addition, the fifth minimum thickness D5 may be smaller than the above-described first minimum thickness.

In addition, the second lens assembly 1222b may further include the fourth outer side surface M4 that is the lower surface of the second lens holder LAH2.

In addition, the fourth outer side surface M4 may include a 4-1 outer region M4a and a 4-2 outer region M4b that are symmetrical in the first direction and have curved outer corners. For example, a plurality of (e.g., two) 4-1 outer regions M4a may be present, spaced apart from each other in the second direction (Y-axis direction), and positioned adjacent to the first guide unit G1 and the second guide unit G2. In addition, a plurality of (e.g., two) 4-2 outer regions M4b may be present, may be in contact with the 4-1 outer region M4a, and may be disposed to be spaced apart from each other in the first direction (X-axis direction).

An outer edge of the 4-1 outer region M4a may have a greater curvature than an outer edge of the 4-2 outer region M4b. For example, the outer edge of the 4-2 outer region M4b may be parallel to the second direction (Y-axis direction).

A sixth minimum thickness D6 of the 4-1 outer region M4a may be greater than a minimum thickness of the 4-2 outer region M4b. In addition, the sixth minimum thickness D6 may be smaller than the above-described third minimum thickness.

With this configuration, it is possible to easily secure a space in which the bonding member is disposed on the facing first and second outer side surfaces between the first lens assembly and the second lens assembly.

In addition, an area (e.g., a diameter) of the first lens hole in the first lens assembly 1222a may increase in the third direction (Z-axis direction). For example, the area of the first lens hole of the first outer side surface of the first lens assembly 1222a may be smaller than an area of the first lens hole of the third outer side surface. Therefore, it is possible to easily insert lenses (e.g., two lenses) of the second lens group in the third direction (Z-axis direction).

Furthermore, the area (e.g., the diameter) of the second lens hole in the second lens assembly 1222b may increase in a direction opposite to the third direction (Z-axis direction). For example, an area of the second lens hole of the second outer side surface of the second lens assembly 1222b may be smaller than an area of the second lens hole of the fourth outer side surface. Therefore, it is possible to easily insert lenses (e.g., two lenses) of the third lens group in the direction opposite to the third direction (Z-axis direction).

In addition, since the areas of the lens holes of the first lens assembly 1222a and the second lens assembly 1222b increase in opposite directions, the lenses may also be inserted in opposite directions. For example, the second lens group may be easily inserted into and accommodated in the first lens hole of the first lens holder LAH1 in the optical axis direction. In addition, the third lens group may be easily inserted into and accommodated in the second lens hole of the second lens holder LAH2 in the opposite direction to the optical axis direction. In other words, the second lens group and the third lens group are inserted in opposite directions, the assembly of the first and second lens assemblies and the second and third lens groups can be easily performed after the first and second lens assemblies are coupled.

FIG. 22 is a perspective view of a first lens assembly, a first bonding member, and a second lens assembly according to another embodiment, FIG. 23 is a view showing a first outer side surface of the first lens assembly according to another embodiment, and FIG. 24 is a view showing a second outer side surface of the second lens assembly according to another embodiment.

Referring to FIGS. 22 to 24, in a second camera actuator according to another embodiment, the first bonding member 1280a may be disposed in the first lens assembly 1222a. The bonding member may not be disposed in the second lens assembly 1222b. Except for the following description, the above description may be applied to the description of the components of the second camera actuator, such as the first lens assembly, the second lens assembly, and the bonding member, in the same manner.

The first outer side surface M1 of the first lens assembly 1222a according to another embodiment may include the 1-1 outer region M1a symmetrical in the first direction (X-axis direction) and having the curved outer edge CE1 and the 1-2 outer region M1b symmetrical in the second direction (Y-axis direction) and having the flat outer edge PE1.

In addition, the second outer side surface M2, which is the upper surface of the second lens holder LAH2, may include a 2-1 outer region M2a symmetrical in the first direction (X-axis direction) and having a curved outer edge CE2 and a 2-2 outer region M2b symmetrical in the second direction (Y-axis direction) and having a flat outer edge PE2. For example, a plurality of (e.g., two) 2-1 outer regions M2a may be present, spaced apart from each other in the second direction (Y-axis direction), and positioned adjacent to the first guide unit G1 and the second guide unit G2.

In addition, a plurality of (e.g., two) 2-2 outer regions M2b may be present, may be in contact with the 2-1 outer region M2a, and may be disposed to be spaced apart from each other in the first direction (X-axis direction).

The outer edge CE2 of the 2-1 outer region M2a may have a greater curvature than the outer edge PE2 of the 2-2 outer region M2b. For example, the outer edge PE2 of the 2-2 outer region M2b may be parallel to the second direction (Y-axis direction).

In an embodiment, the first bonding member 1280a may be disposed in the 1-1 outer region M1a and the 1-2 outer region M1b. In addition, the first bonding member 1280a may be disposed only in the 1-1 outer region M1a. In addition, the above-described second bonding member may not be positioned in the 1-2 outer region.

In addition, in the embodiment, the bonding member may be in contact with only the first outer side surface M1. Therefore, the bonding member is separated in contact with only the first outer side surface M1 by heating and a portion of the bonding member is separated not in contact with the second outer side surface M2, and thus the impact may fully spread only to the whole bonding member. As described above, it is possible to improve the impact reliability of the second camera actuator by the bonding member.

FIG. 25 is a perspective view of a first lens assembly, a second bonding member, and a second lens assembly according to still another embodiment, FIG. 26 is a view showing a first outer side surface of the first lens assembly according to still another embodiment, and FIG. 27 is a view showing a second outer side surface of the second lens assembly according to still another embodiment.

Referring to FIGS. 25 to 27, in a second camera actuator according to still another embodiment, the second bonding member 1280b may be disposed in the second lens assembly 1222b. The bonding member may not be disposed in the first lens assembly 1222a. Except for the following description, the above description may be applied to the description of the components of the second camera actuator, such as the first lens assembly, the second lens assembly, and the bonding member, in the same manner.

The first outer side surface M1 of the first lens holder LAH1 according to still another embodiment may include a 1-1 outer region M1a symmetrical in the first direction (X-axis direction) and having the curved outer edge CE1 and the 1-2 outer region M1b symmetrical in the second direction (Y-axis direction) and having the flat outer edge PE1.

In addition, the second outer side surface M2, which is the upper surface of the second lens holder LAH2, may include a 2-1 outer region M2a symmetrical in the first direction (X-axis direction) and having a curved outer edge CE2 and a 2-2 outer region M2b symmetrical in the second direction (Y-axis direction) and having a flat outer edge PE2. For example, a plurality of (e.g., two) 2-1 outer regions M2a may be present, spaced apart from each other in the second direction (Y-axis direction), and positioned adjacent to the first guide unit G1 and the second guide unit G2.

In addition, a plurality of (e.g., two) 2-2 outer regions M2b may be present, may be in contact with the 2-1 outer region M2a, and may be disposed to be spaced apart from each other in the first direction (X-axis direction).

The outer edge CE2 of the 2-1 outer region M2a may have a greater curvature than the outer edge PE2 of the 2-2 outer region M2b. For example, the outer edge PE2 of the 2-2 outer region M2b may be parallel to the second direction (Y-axis direction).

In an embodiment, the second bonding member 1280b may be disposed in the 2-1 outer region M2a and the 2-2 outer region M2b. In addition, the second bonding member 1280b may be disposed only in the 2-1 outer region M2a. In addition, the above-described second bonding member may not be positioned in the 1-2 outer region.

In addition, in the embodiment, the bonding member may be in contact with only the second outer side surface M2. Therefore, the bonding member is separated in contact with only the second outer side surface M2 by heating, and a portion of the bonding member is separated not in contact with the first outer side surface M1, and thus the impact may fully spread only to the whole bonding member. Furthermore, it is possible to easily absorb the impact on the second lens assembly coupled to the third lens group having a greater moving distance. As described above, it is possible to improve the impact reliability of the second camera actuator by the bonding member.

FIG. 28 is a perspective view of a first side board, a fourth coil, a fourth magnet, a first sensor, a first lens assembly, and a third lens group in the second camera actuator according to the embodiment, FIG. 29 is a top view of the first side board, the fourth coil, the fourth magnet, the first sensor, the first lens assembly, and the third lens group in the second camera actuator according to the embodiment, and FIG. 30 is a side view of the fourth magnet, the fourth coil, and the first sensor in the second camera actuator according to the embodiment.

Referring to FIGS. 28 to 30, in the second camera actuator according to the embodiment, the first side board 1271 may be positioned at an outer side. In addition, the following description will be given on the basis of the fact that the sensor unit of the second camera actuator is the first sensor, the driving magnet is the fourth magnet (or the first magnet or the first magnet of the second camera actuator), the driving coil is the fourth coil (or the first coil or the first coil of the second camera actuator), the second board unit is the first side board, and the lens assembly is the first lens assembly.

In an embodiment, the sensor unit may be disposed on the outer side surface of the first side board 1271 or the outer side surface of the second side board, and the driving coil may be disposed on the inner side surface of the first side board 1271 or the inner side surface of the second side board.

Specifically, the driving magnet, the driving coil, and the sensor unit are disposed in a direction away from the optical axis and may not overlap one another in the optical axis direction or the third direction. The first sensor 1253a may be positioned on the outer side surface of the first side board 1271. In addition, a fourth coil 1252a may be positioned on the inner side surface of the first side board 1271. In other words, the first side board 1271 may be positioned between the first sensor 1253a and the fourth coil 1252a. With this configuration, the sensor unit may easily maintain the sensitivity of the magnetic force received from the driving magnet and the driving coil and accurately detect the linearity of the output through the sensor unit. In addition, when the sensor unit is adjacent to the driving magnet, it is possible to prevent the degradation of the linearity caused by a large change according to the movement (or the stroke) of the sensor unit.

In addition, the fourth magnet 1251a may be positioned to face the fourth coil 1252a. For example, at least a portion of the fourth magnet 1251a may be positioned to overlap the fourth coil 1252a in the second direction (Y-axis direction).

In addition, the fourth magnet 1251a may be seated on the side surface of the first lens assembly 1222a as described above. In addition, the third lens group 1221c may be coupled to the first lens assembly 1222a to move in the third direction (Z-axis direction).

In an embodiment, the fourth coil 1252a may be positioned between the fourth magnet 1251a and the first sensor 1253a. In other words, the first sensor 1253a may be positioned outside the fourth coil 1252a and the fourth magnet 1251a.

In addition, the fourth coil 1252a may have a first separation distance W3 from the fourth magnet 1251a in the second direction (Y-axis direction). A ratio of the first separation distance W3 to a width W1 of the fourth magnet 1251a in the second direction (Y-axis direction) may be 1:0.3 to 1:0.45. When the ratio is smaller than 1:0.3, the size of the second camera actuator increases, making it difficult to miniaturize, and when the ratio is greater than 1:0.45, there is a problem of being out of a range of a magnetic force that may be detected by the first sensor.

In addition, a width W2 of the fourth coil 1252a in the second direction (Y-axis direction) may be greater than the width W1 of the fourth magnet 1251a in the second direction (Y-axis direction).

In addition, in the second camera actuator according to the embodiment, the first lens assembly 1222a, the third lens group 1221c, and the fourth magnet 1251a may move integrally in the third direction (Z-axis direction).

First, the fourth magnet 1251a may include a first polarity portion 1251aa, a second polarity portion 1251ab having a different polarity from the first polarity portion 1251aa, and an air gap 1251ac positioned between the first polarity portion 1251aa and the second polarity portion 1251ab.

For example, the first polarity portion 1251aa, the air gap 1251ac, and the second polarity portion 1251ab may be sequentially disposed in the third direction (Z-axis direction).

In addition, the first polarity portion 1251aa may be any one of an N pole and an S pole, and the second polarity portion 1251ab may be the other of the N pole and the S pole.

In addition, in an embodiment, since the fourth magnet 1251a has the air gap 1251ac, an output from the first sensor 1253a according to the movement of the fourth magnet 1251a may be linearly output. In other words, a change in magnetic force may occur linearly according to the positional relationship between the sensor unit (e.g., the first sensor) and the driving magnet (e.g., the first magnet) by the air gap 1251ac. For example, the first sensor 1253a may output an output of the magnetic force from the fourth magnet 1251a as a voltage, and this will be described.

In addition, at least a portion of the fourth coil 1252a of the second camera actuator 1200 may overlap the fourth magnet 1251a of the second camera actuator 1200 in the second direction (Y-axis direction). For example, with respect to a center position (zero stroke), the fourth coil 1252a may include a first region SS1a and SS1b overlapping the fourth magnet 1251a in the second direction (Y-axis direction) and a second region SS2a and SS2b not overlapping the fourth magnet 1251a in the second direction (Y-axis direction). In other words, the second region SS2a and SS2b may be regions other than the first region SS1a and SS1b. In addition, in the specification, the center position (zero stroke) means a bisecting point of a movable distance of the fourth magnet 1251a. In the second camera actuator according to the embodiment, the lens assembly may move from a rear end to a front end of the second camera actuator or move from the front end to the rear end thereof. Therefore, it should be understood that the zero stroke does not mean only a start position of the movement of the lens assembly.

In addition, the first region SS1a and SS1b may be a region in which the driving coil and the driving magnet overlap each other in a direction from the driving magnet to the driving coil or in an opposite direction. The second region SS2a and SS2b may be a region of the driving coil disposed above or under the driving magnet.

The first region SS1a and SS1b may include the 1-1 region SS1a and the 1-2 region SS1b. The 1-1 region SS1a may be a region of the first region positioned above a first virtual line Va, and the 1-2 region SS1b may be a region of the first region position under the first virtual line Va. The first virtual line Va may be a bisector of the fourth magnet 1251a in the first direction (X-axis direction). In addition, a second virtual line Vb to be described below may be a bisector of the fourth magnet 1251a in the third direction (Z-axis direction). Alternatively, the first virtual line Va may be the bisector of a short side La of the fourth magnet 1251a, and the second virtual line Vb may be the bisector of a long side Wa of the fourth magnet 1251a. In addition, the first virtual line Va may be a bisector of the fourth magnet 1251a of the driving magnet in the optical axis direction or in the third direction.

In addition, the second regions SS2a and SS2b may include the 2-1 region SS2a and the 2-2 region SS2b. The 2-1 region SS2a is positioned under the 1-1 region SS1a and may not overlap the fourth magnet 1251a in the second direction (Y-axis direction). In addition, the 2-2 region SS2b is positioned above the 1-2 region SS1b and may not overlap the fourth magnet 1251a in the second direction (Y-axis direction).

In an embodiment, only the first region of the fourth coil 1252a, which overlaps the fourth magnet 1251a in the second direction (Y-axis direction), may be changed.

In addition, the first sensor 1253a may be positioned in the air gap 1251ac or under/above the air gap 1251ac at the center position (zero stroke). In other words, the first sensor 1253a may be positioned in a region between the first polarity portion 1251aa and the second polarity portion 1251ab. Alternatively, the first sensor 1253a may be disposed to be spaced apart from the first virtual line Va. Alternatively, the first sensor 1253a may be positioned in the 1-1 region SS1a or the 1-2 region SS1b. With this configuration, the first sensor 1253a may minimally receive a magnetic force at the center position. Therefore, the first sensor 1253a may have high linearity performance with a different polarity, that is, the same height with respect to the center position with respect to the entire movement or the entire stroke of the fourth magnet 1251a.

In other words, the first sensor 1253a according to the embodiment may be positioned above/under the first virtual line Va or above/under the center of the fourth magnet 1251a. In other words, the sensor unit may not overlap the driving magnet in the second direction. With this configuration, it is possible to solve a problem of exceeding the sensing sensitivity of the first sensor 1253*a* with a strong magnetic force. In addition, it is possible to solve a problem that it is difficult to detect the change in the magnetic force generated from the fourth magnet 1251*a* due to a small amount of change.

Furthermore, a separation distance dd1 of the first sensor 1253*a* according to the embodiment from the first virtual line Va may be changed. In addition, the first sensor 1253*a* according to the embodiment may be positioned to overlap any one of the 2-1 region SS2*a* and the 2-2 region SS2*b* in the second direction (Y-axis direction). With this configuration, it is possible to minimize a magnetic force generated from the first region SS1*a* and SS1*b* in preparation for a case in which the first sensor 1253*a* is disposed in the first region SS1*a* and SS1*b*. Therefore, it is possible to improve the performance of the first sensor.

According to an embodiment, a ratio of the separation distance dd1 to the length Lb of the first coil in the first direction (X-axis direction) may be 1:2.04 to 1:3.7. When the ratio is smaller than 1:2.04, the accuracy of the first sensor may be reduced by the influence of the magnetic force generated from the first coil and the influence by the magnetic force of the first magnet. In addition, when the ratio is greater than 1:3.7, there is a problem that the influence of the magnetic force from the first coil and the first magnet is insignificant and miniaturization is difficult.

Furthermore, the above description of the first side board 1271, the fourth coil 1252*a*, the fourth magnet 1251*a*, the first sensor 1253*a*, the first lens assembly 1222*a*, and the third lens group 1221*c* may be applied to a second side board, a fifth coil (or a second coil of the second camera actuator or a second coil), a fifth magnet (or a second magnet of the second camera actuator or a second magnet), a second sensor, a second lens assembly, and a second lens group in the same manner.

FIG. 31 is a view for describing the positional relationship between the fourth magnet, the fourth coil, and the first sensor according to driving in the second camera actuator according to the embodiment, FIG. 32 is a view showing the driving of the first sensor overlapping a second region in a second direction in the second camera actuator according to the embodiment, and FIG. 33 is a view showing the driving of the first sensor overlapping a first region in the second direction in the second camera actuator according to the embodiment.

As described above, the fourth magnet 1251*a* may move in the third direction (Z-axis direction) together with the first lens assembly 1222*a* and the third lens group 1221*c*. For example, FIG. 31A shows a wide state, FIG. 31C shows a telephoto state, and FIG. 31B shows a center position state.

In addition, the first region of the fourth coil 1252*a* may overlap the fourth magnet 1251*a* in the second direction (Y-axis direction), and as the fourth magnet 1251*a* moves in the third direction (Z-axis direction), the magnetic force received from the fourth magnet 1251*a* may be different.

For example, in the wide state, the first sensor 1253*a* may be positioned adjacent to the first polarity portion 1251*aa*. For example, the first sensor 1253*a* may be positioned under the first polarity portion 1251*aa*.

In addition, in the telephoto state, the first sensor 1253*a* may be positioned adjacent to the second polarity portion 1251*ab*. For example, the first sensor 1253*a* may be positioned under the second polarity portion 1251*ab*.

In addition, in the center position state, the first sensor 1253*a* may be positioned adjacent to the air gap 1251*ac*. For example, the first sensor 1253*a* may be positioned under the air gap 1251*ac*.

Furthermore, the first sensor 1253*a* may be positioned in the second region of the fourth coil 1252*a*. When the first sensor 1253*a* is positioned in the first region, the first sensor 1253*a* may receive the magnetic force generated in the first region of the fourth coil 1252*a*. Unlike this, when the first sensor 1253*b* is positioned in the second region, the first sensor 1253*a* can minimize the effect of the magnetic force generated in the first region of the fourth coil 1252*a*. Therefore, it is possible to more accurately detect the magnetic force through the first sensor 1253*a*.

In addition, the first sensor 1253*a* may be disposed in the second region, thereby minimizing the influence of the magnetic force generated in the 2-1 region and the magnetic force generated in the 2-2 region. Therefore, the first sensor 1253*a* may linearly detect the magnetic force according to the position of the fourth magnet 1251*a* (see FIGS. 32 and 33).

The position of the first sensor 1253*a* may also be applied to the second camera actuator having the above-described first and second lens assemblies according to the embodiment, another embodiment, and still another embodiment in the same manner. Therefore, it is possible to not only implement the long stroke, thereby improving the reliability between the first and second lens assemblies but also improve accuracy in implementing the long stroke, thereby further preventing damage due to a collision.

FIG. 34 is a perspective view of a mobile terminal to which the camera device according to the embodiment is applied.

Referring to FIG. 34, a mobile terminal 1500 according to the embodiment may include a camera device 1000, a flash module 1530, and an AF device 1510, which are provided on a rear surface thereof.

The camera device 1000 may include an image capturing function and an AF function. For example, the camera device 1000 may include the AF function using an image.

The camera device 1000 processes an image frame of a still image or a moving image obtained by an image sensor in a capturing mode or a video call mode.

The processed image frame may be displayed on a predetermined display and stored in a memory. A camera (not shown) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the AF, zooming, and OIS functions may be performed by the second camera device 1000B. In this case, since the first camera device 1000A includes both of the first camera actuator and the second camera actuator, the camera device can be easily miniaturized by changing an optical path.

The flash module 1530 may include a light emitting device for emitting light therein. The flash module 1530 may be operated by a camera operation of the mobile terminal or the user's control.

The AF device 1510 may include one of a package of a surface light emitting laser device as a light emitting unit.

The AF device 1510 may include the AF function using a laser. The AF device 1510 may be mainly used in a condition that the AF function using the image of the camera device 1000 is degraded, for example, a proximity of 10 m or less or dark environment.

The AF device 1510 may include a light emitting unit including a vertical cavity surface emitting laser (VCSEL)

semiconductor device and a light receiving unit for converting light energy into electrical energy, such as a photodiode.

FIG. 35 is a perspective view of a vehicle to which the camera module according to the embodiment is applied.

For example, FIG. 35 is an external view of the vehicle including a vehicle driver assistance device to which the camera device 1000 according to the embodiment is applied.

Referring to FIG. 35, a vehicle 700 in the embodiment may include wheels 13FL and 13FR rotated by a power source and a predetermined sensor. The sensor may be a camera sensor 2000, but the present invention is not limited thereto.

The camera sensor 2000 may be a camera sensor to which the camera device 1000 according to the embodiment is applied. The vehicle 700 in the embodiment may acquire image information through the camera sensor 2000 for capturing a front image or a surrounding image, determine a situation in which a lane line is not identified using the image information, and generate a virtual lane line when the lane line is not identified.

For example, the camera sensor 2000 may acquire a front image by capturing a view in front of the vehicle 700, and a processor (not shown) may acquire image information by analyzing an object included in the front image.

For example, when objects, such as a median, a curb, or a street tree corresponding to a lane line, an adjacent vehicle, a traveling obstacle, and an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

At this time, the camera sensor 2000 may include a stereo camera for improving the measurement accuracy of the object and further securing information such as a distance between the vehicle 700 and the object, but the present invention is not limited thereto.

Although embodiments have been mainly described above, these are only illustrative and do not limit the present invention, and those skilled in the art to which the present invention pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present invention defined in the appended claims.

The invention claimed is:

1. A camera actuator comprising:
   a housing;
   a first lens assembly and a second lens assembly moving in an optical axis direction in the housing; and
   a driving unit configured to move the first lens assembly and the second lens assembly,
   wherein the first lens assembly includes a first outer side surface,
   wherein the second lens assembly includes a second outer side surface facing the first outer side surface and at least partially overlapping the first outer side surface in the optical axis direction, and
   comprising a bonding member in contact with at least one of the first outer side surface and the second outer side surface.

2. The camera actuator of claim 1, wherein the bonding member includes:
   a first bonding member in contact with the first outer side surface; and
   a second bonding member in contact with the second outer side surface.

3. The camera actuator of claim 2, wherein the first bonding member and the second bonding member do not overlap at least partially in the optical axis direction.

4. The camera actuator of claim 2, wherein a first length of the first bonding member in the optical axis direction is smaller than a second length of the second bonding member in the optical axis direction.

5. The camera actuator of claim 2,
   wherein the first bonding member overlaps with the first outer side surface in the optical axis direction.

6. The camera actuator of claim 2,
   wherein the second bonding member overlaps with the second outer side surface in the optical axis direction.

7. The camera actuator of claim 2,
   wherein the outer side surface of the first bonding member and the outer side surface of the second bonding member may correspond to each other.

8. The camera actuator of claim 1, wherein the first lens assembly includes a first lens hole,
   the second lens assembly includes a second lens hole, and
   the camera actuator further includes at least one lens disposed in each of the first lens hole and the second lens hole.

9. The camera actuator of claim 1, wherein the first outer side surface includes:
   a 1-1 outer region symmetrical in a first direction perpendicular to the optical axis direction and having a curved outer edge; and
   a 1-2 outer region symmetrical in a second direction perpendicular to the first direction and having a flat outer edge.

10. The camera actuator of claim 9, wherein a first minimum thickness of the 1-1 outer region is greater than a second minimum thickness of the 1-2 outer region.

11. The camera actuator of claim 9, wherein the bonding member is disposed in the 1-1 outer region.

12. The camera actuator of claim 9, wherein the first lens assembly includes a third outer side surface opposite to the first outer side surface, and
   the third outer side surface includes a 3-1 outer region symmetrical in the first direction perpendicular to the optical axis direction and having a curved outer edge and a 3-2 outer region symmetrical in the second direction perpendicular to the first direction and having a flat outer edge.

13. The camera actuator of claim 12, wherein a first minimum thickness of the 1-1 outer region is greater than a minimum thickness of the 3-1 outer region.

14. The camera actuator of claim 12,
wherein the second lens assembly includes a fourth outer side surface opposite to the second outer side surface,
wherein the first outer side surface to the fourth outer side surface at least partially overlap each other in the optical axis direction.

15. The camera actuator of claim 1, wherein the second outer side surface includes:
a 2-1 outer region symmetrical in a first direction perpendicular to the optical axis direction and having a curved outer edge; and
a 2-2 outer region symmetrical in a second direction perpendicular to the first direction and having a flat outer edge.

16. The camera actuator of claim 15, wherein a third minimum thickness of the 2-1 outer region is greater than a fourth minimum thickness of the 2-2 outer region.

17. The camera actuator of claim 15, wherein the bonding member is in contact with the 2-1 outer region.

18. The camera actuator of claim 15, wherein the second lens assembly includes a fourth outer side surface opposite to the second outer side surface,
the fourth outer side surface includes a 4-1 outer region symmetrical in the first direction perpendicular to the optical axis direction and having a curved outer edge and a 4-2 outer region symmetrical in the second direction perpendicular to the first direction and having a flat outer edge.

19. The camera actuator of claim 18,
wherein a third minimum thickness of the 2-1 outer region is greater than a minimum thickness of the 4-1 outer region.

20. The camera actuator of claim 1, wherein the first lens assembly moves within a first moving distance in the optical axis direction,
the second lens assembly moves within a second moving distance in the optical axis direction, and
the first moving distance is smaller than the second moving distance.

* * * * *